US011100214B2

(12) United States Patent
Seo

(10) Patent No.: US 11,100,214 B2
(45) Date of Patent: Aug. 24, 2021

(54) SECURITY ENHANCEMENT METHOD AND ELECTRONIC DEVICE THEREFOR

(71) Applicant: Samsung Electronics Co., Ltd., Suwon-si (KR)

(72) Inventor: Jaewoo Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 270 days.

(21) Appl. No.: 16/211,654

(22) Filed: Dec. 6, 2018

(65) Prior Publication Data
US 2019/0180028 A1 Jun. 13, 2019

(30) Foreign Application Priority Data

Dec. 7, 2017 (KR) ........................ 10-2017-0167588

(51) Int. Cl.
*G06F 21/51* (2013.01)
*G06F 21/12* (2013.01)
(Continued)

(52) U.S. Cl.
CPC ................ *G06F 21/51* (2013.01); *G06F 8/62* (2013.01); *G06F 21/121* (2013.01); *G06F 21/44* (2013.01); *G06F 21/53* (2013.01); *G06F 21/577* (2013.01); *G06F 21/602* (2013.01); *G06F 21/629* (2013.01); *G06F 8/61* (2013.01);
(Continued)

(58) Field of Classification Search
CPC ........ G06F 21/51; G06F 21/44; G06F 21/602; G06F 21/121; G06F 21/629; G06F 21/53; G06F 21/577; G06F 21/566; G06F 21/563; G06F 2221/2101; G06F 2221/033;
(Continued)

(56) References Cited

U.S. PATENT DOCUMENTS 9,514,309 B1 * 12/2016 Mann ..................... G06F 21/565
10,447,671 B1 * 10/2019 Meckl ................... H04L 63/062
(Continued)

FOREIGN PATENT DOCUMENTS

AU 2015 213 797 A1 9/2016

OTHER PUBLICATIONS

N. Patel, A. Sasan and H. Homayoun, "Analyzing hardware based malware detectors," 2017 54th ACM/EDAC/IEEE Design Automation Conference (DAC), Austin, TX, 2017, pp. 1-6 [online][retrieved on Oct. 12, 2020], Retrieved from: IEEEXplore (Year: 2017).*
International Search Report dated Mar. 26, 2019, issued in International Patent Application No. PCT/KR2018/015355.
(Continued)

Primary Examiner — Kevin Bechtel
Assistant Examiner — Sangseok Park
(74) Attorney, Agent, or Firm — Jefferson IP Law, LLP

(57) ABSTRACT

An electronic device and method that are robust against attacks on encryption-related vulnerabilities as detection of an encryption algorithm based on if artificial intelligence technology is enabled are provided. A security enhancement method includes a hooking loading of an executable code into a memory, inputting the executable code into an encryption code identification model that is based on an artificial neural network, determining, by the encryption code identification model, whether the loading of the executable code into the memory is allowed, and when the loading of the executable code is not allowed, blocking the loading of the executable code into the memory.

20 Claims, 18 Drawing Sheets

(51) Int. Cl.
*G06F 21/62* (2013.01)
*G06F 21/53* (2013.01)
*G06F 8/61* (2018.01)
*G06F 21/57* (2013.01)
*G06F 21/44* (2013.01)
*G06F 21/60* (2013.01)

(52) U.S. Cl.
CPC .............. *G06F 2221/033* (2013.01); *G06F 2221/2101* (2013.01); *G06F 2221/2141* (2013.01); *G06F 2221/2149* (2013.01)

(58) Field of Classification Search
CPC ..... G06F 2221/2141; G06F 2221/2149; G06F 8/62; G06F 8/61; G06F 9/44521
See application file for complete search history.

(56) References Cited

U.S. PATENT DOCUMENTS

| | | | |
|---|---|---|---|
| 2007/0240136 A1* | 10/2007 | Garyali | G06F 9/468 717/140 |
| 2008/0091677 A1* | 4/2008 | Pedersen | G06F 21/602 |
| 2012/0159193 A1 | 6/2012 | Spradlin | |
| 2012/0180126 A1* | 7/2012 | Liu | G06F 21/81 726/22 |
| 2013/0219498 A1* | 8/2013 | Lee | G06F 21/56 726/23 |
| 2014/0298295 A1 | 10/2014 | Overbeck | |
| 2015/0089645 A1 | 3/2015 | Vandergeest | |
| 2015/0373036 A1 | 12/2015 | Patne et al. | |
| 2016/0246800 A1 | 8/2016 | Soeder et al. | |
| 2017/0046510 A1 | 2/2017 | Chen et al. | |
| 2017/0098214 A1 | 4/2017 | Le Buhan et al. | |
| 2018/0129807 A1* | 5/2018 | Azarafrooz | G06F 21/566 |
| 2019/0044958 A1* | 2/2019 | Woodworth, Jr. | H04L 63/1408 |
| 2020/0019702 A1* | 1/2020 | Tong | G06F 21/56 |

OTHER PUBLICATIONS

Shabtai et al.; Detection of malicious code by applying machine learning classifiers on static features: A state-of-the-art survey; Elsevier; Science Direct; Information Security Technical Report 14; (2009) 16-29; XP 85899283 A; Feb. 1, 2009.
European Search Report dated Jun. 4, 2020; European Appln. No. 18886351.8-1218 / 3665604 PCT/KR2018015355.

* cited by examiner

FIG. 7

| APP ID | AVAILABLE ENCRYPTION ALGORITHM | ACCESSIBLE OBJECT |
|---|---|---|
| APP#1 | sha-256 \| aes-128-cbc | contacts |
| APP#2 | RSA | photo |
| APP#3 | hmac-128 | file \| photo |
| APP#4 | hmac-128 \| sha-256 | contacts \| file |

ACCESS LIST — 132b

SECURITY ENHANCEMENT METHOD AND ELECTRONIC DEVICE THEREFOR

CROSS-REFERENCE TO RELATED APPLICATION(S)

This application is based on and claims priority under 35 U.S.C. § 119(a) of a Korean patent application number 10-2017-0167588, filed on Dec. 7, 2017, in the Korean Intellectual Property Office, the disclosure of which is incorporated by reference herein in its entirety.

BACKGROUND

1. Field

The disclosure relates to an artificial intelligence (AI) system which mimics recognition and judgment of the human brain by using a machine-learning algorithm such as deep learning, and application thereof. More particularly, the disclosure relates to an electronic device that is robust to encryption exploit by enabling detection of an encryption algorithm based on AI technology, and a method thereof. More particularly, the disclosure relates to an electronic device capable of coping with an exploit that exploits encryption vulnerabilities, such as unauthorized data encryption, irrespective of a user's intention, or data encryption beyond the rights acquired in relation to encryption, and a method that may be performed using the electronic device.

2. Description of Related Art

AI system is a computer system that implements human-level intelligence. According to an AI system, unlike existing rule-based smart systems, a machine learns by itself, makes judgments, and becomes more intelligent. The more an AI system is used, the greater the recognition rate and the more accurately a user's preferences are understood, and thus rule-based smart systems of the related art are gradually being replaced with deep-learning-based AI systems.

AI technology consists of machine learning such as deep learning, and element technologies utilizing machine learning.

Machine learning is an algorithm-based technology that classifies and learns the characteristics of input data independently. Element technology is a technology that simulates functions of the human brain such as recognition and judgment by using a machine-learning algorithm such as deep learning, and is divided into fields such as linguistic comprehension, visual comprehension, reasoning/prediction, knowledge representation, and motion control.

Various fields in which AI technology is applied are as follows. Linguistic comprehension is a technique of recognizing human language and characters and applying and processing the same, and includes natural language processing, machine translation, dialogue systems, query responses, speech recognition/synthesis, and the like. Visual comprehension is a technique of recognizing and processing objects like in the human visual system, and includes object recognition, object tracking, image search, human recognition, scene understanding, spatial understanding, and image enhancement. Inferential prediction is a technique of making logical inferences and predictions by judging information, and includes knowledge/probability-based reasoning, optimization prediction, preference-based planning, and recommendation. Knowledge representation is a technique of automating human experience information into knowledge data and includes knowledge building (data generation/classification) and knowledge management (data utilization). Motion control is a technique of controlling autonomous driving of a vehicle and motion of a robot, and includes motion control (navigation, collision, and traveling), operation control (behavior control), and the like.

When data is encrypted by a malicious program such as ransomware or malware without permission, it is very difficult to restore the encrypted data. Therefore, it is preferable to block encryption before the malicious program encrypts data.

According to technology of the related art, a malicious program is identified based on a program identifier such as a signature or a hash value of an executable code or by analyzing the behavior of the malicious program, and the identified malicious program is removed or execution thereof is blocked. However, according to technology of the related art, since new malicious programs are constantly emerging, a considerable amount of time and expense are required to quickly and accurately identify new malicious programs. Also, even when a program is determined not to be a malicious program, it is impossible to prevent an act of the program of performing encryption beyond the rights approved for that program.

In order to take action against various patterns of inappropriate data encryption, the aid of artificial intelligence technology that simulates judgment of the human brain is needed. That is, it is necessary to provide a security enhancement technique for enhancing the ability to detect vulnerability exploits related to encryption based on detection of an encryption algorithm based on artificial intelligence technology.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a security-enhancing electronic device and a security enhancement method that are robust against an encryption-based hacking attack.

Another aspect of the disclosure is to provide an electronic device and method in which an encryption algorithm executable code included in an executable code of an application is identified, and execution of the application is blocked based on at least one of whether an encryption algorithm executable code is found and a type of the found encryption algorithm.

Another aspect of the disclosure is to provide an electronic device and method in which loading of an application into a memory is selectively blocked based on a result of identifying an encryption algorithm included in an executable code of the application.

Another aspect of the disclosure is to provide an electronic device and method in which an application is executed in a security environment blocked from the outside, and an encryption algorithm included in the application is identified based on a result of the execution.

Another aspect of the disclosure is to provide an electronic device and method, to which artificial intelligence technology is applied, in which an encryption algorithm included in an executable code of an application is identified by using an encryption code identification model obtained by machine learning by using feature data extracted using a result of static analysis and dynamic analysis of the executable code of the application.

Another aspect of the disclosure is to provide an electronic device and method in which whether to allow installation of an application is determined based on a result of identifying an encryption algorithm included in an executable code of the application.

Another aspect of the disclosure is to provide an electronic device and method in which stability of an encryption function of an application is pretested based on a result of identifying an encryption algorithm included in an executable code of the application.

Another aspect of the disclosure is to provide an electronic device and method in which an encryption attempt beyond the rights of access approved for an application is detected and prevented.

Another aspect of the disclosure is to provide an electronic device in which a security environment, in which a test is performed by hooking a memory load of an application, is implemented by using an additional exclusive processor.

Another aspect of the disclosure is to provide a system in which enhancement of security of a user terminal is induced by updating, in the user terminal, an encryption code identification model obtained by machine learning through feature data about a code of an encryption algorithm and information about vulnerabilities of an encryption algorithm.

Additional aspects will be set forth in part in the description which follows and, in part, will be apparent from the description, or may be learned by practice of the presented embodiments.

In accordance with an aspect of the disclosure, a security enhancement method performed using an electronic device is provided. The security enhancement method includes, hooking loading of executable code into a memory, inputting the executable code into an encryption code identification model, determining, by using the encryption code identification model, whether the loading of the executable code into the memory is allowed, and when the loading of the executable code is not allowed, blocking the loading of the executable code into the memory.

The method further comprises extracting feature data from the executable code and inputting the feature data into the encryption code identification model. The feature data may include a call sequence of a mathematical function or a logical function that is repeatedly called during execution of the executable code. The feature data may include power consumption data related to power consumption of a central processing unit (CPU) during execution of the executable code. The power consumption data includes a number of CPU operation cycles when the power consumption of the CPU is equal to or greater than a threshold.

The determining of whether a memory load of the executable code is allowed may include when output data of the encryption code identification model indicates that encryption code is detected in the executable code, the loading of the executable code is not allowed, and when the output data of the encryption code identification model indicates that encryption code is not detected in the executable code, the loading of the executable code is allowed.

The security enhancement method may further include, when installing an application including the executable code, obtaining available encryption algorithms from permission information included in an installation package of the application, and matching and storing identification information of the application and the available encryption algorithms in an access list, wherein, when output data of the encryption code identification model identifies an encryption algorithm that is not in the access list, the loading of the executable code is not allowed.

The security enhancement method may further include receiving vulnerability information of an encryption algorithm from an external device and storing the vulnerability information in a vulnerability list, wherein, when output data of the encryption code identification model identifies a vulnerability in the vulnerability list, the loading of the executable code is not allowed.

The method may further comprise determining whether to perform the hooking based on at least one of whether the executable code is included in a white list, a frequency of execution of the executable code, or a period of time that has elapsed since an installation or an update of an application that includes the executable code, and determining whether to perform the hooking based on whether there is an installation history of an application including the executable code.

In accordance with another aspect of the disclosure, a security enhancement method performed using an electronic device is provided. The security enhancement method includes, when installing an application, inputting executable code of the application into an encryption code identification model, determining whether the executable code passes a security test based on output data of the encryption code identification, and when the security test fails, performing a designated process on the application. The determining whether the executable code has passed a security test by using output data of the encryption code identification model may include determining that the executable code failed in passing the security test when an encryption algorithm indicated by output data of the encryption code identification model does not match with information about an available encryption algorithm obtained from the application's required permission information included in an installation package of the application.

In accordance with another aspect of the disclosure, a security enhancement method performed using an electronic device is provided. The security enhancement method includes performing, on a first type of application, a security audit at a first frequency, without user manipulation for executing the first type of application, and performing, on a second type of application, the security audit at a second frequency, without user manipulation for executing the second type of application, wherein the security audit includes inputting executable code of an application to an encryption code identification model, determining whether the executable code has passed a security test based on data output from the encryption code identification model.

In accordance with another aspect of the disclosure, a security enhancement method performed using an electronic device is provided. The security enhancement method includes obtaining available encryption algorithms and accessible objects from permission information included in an installation package of an application, matching and storing identification information of the application, the available encryption algorithms, and the accessible objects in an access list, detecting an instruction to encrypt an object using an encryption algorithm of an encryption application programming interface (API), the encryption API being provided by an operating system installed on the electronic device, determining, based on the access list, whether the encryption algorithm and the object can access the encryption API based on access rights of an application, and when the encryption algorithm or the object cannot access the encryption API, blocking the instruction.

The security enhancement method may further include receiving vulnerability information of an encryption algorithm from an external device, updating a vulnerability list based on the vulnerability information, and determining whether to perform the instruction based on whether the vulnerability list includes a vulnerability to be performed by the instruction.

The security enhancement method may further include receiving vulnerability information of an encryption algorithm from an external device, updating a vulnerability list based on the vulnerability information, and when the vulnerability information includes a vulnerability to be performed by the instruction, notifying the external device of execution of the vulnerability of the encryption algorithm. The external device may collect vulnerability information of an encryption algorithm, and transmit the information to the electronic device, generate statistical data by collecting execution notifications of the vulnerability encryption algorithm from the electronic device, and transmit the statistical data to a system on the developer's side of an application that uses the vulnerable encryption algorithm.

In accordance with another aspect of the disclosure, an electronic device is provided. The electronic device includes a processor, a storage configured to store an application, and a memory storing a plurality of instructions executable by the processor, wherein the plurality of instructions include an instruction to hook loading of executable code of the application into the memory, an instruction to input the executable code into an encryption code identification model, an instruction to determine whether the loading of the executable code is allowed based on the encryption code identification model, and an instruction to, when the loading of the executable code is not allowed, block the loading of the executable code into the memory.

The plurality of instructions may further comprise an instruction to execute the executable code in a security environment, and an instruction to input a value into the encryption code identification model based on a result of the execution of the executable code, wherein the security environment is a sandbox environment, and the result of execution of the executable code does not affect system resources outside of the sandbox environment.

The storage further is further configured to store an access list including available encryption algorithms obtained from permission information included in an installation package of the application. plurality of instructions may further comprise an instruction to determine whether output data of the encryption code identification model identifies an encryption algorithm that is not in the access list. The access list includes accessible objects obtained from the application's required permission information, matched with identification information of the application, and the plurality of instructions may further include an instruction to detect a call of an encryption API, the encryption API being provided by an operating system installed on the electronic device, an instruction to determine, by referring to the access list, whether an encryption algorithm and an object to be encrypted according to the call of the encryption API are within access rights of an application that has called the encryption API, and an instruction to block performing of an encryption-related routine of the called encryption API, when it is determined that the encryption algorithm and the object to be encrypted are not within the access rights of the application.

The electronic device may further include a network interface configured to receive a vulnerability list including information about a vulnerability of an encryption algorithm that is received from an external device via the network interface. The plurality of instructions may further comprise an instruction to determine whether output data of the encryption code identification model identifies a vulnerability in the vulnerability list.

The plurality of instructions further comprise an installation function, wherein the installation function includes an instruction to execute the executable code of in a security environment, an instruction to input the feature data into the encryption code identification model, an instruction to input the feature data into an encryption code identification model, an instruction to determine whether the executable code has passed a security test based on output data of the encryption code identification model, and an instruction to uninstall the application when the security test is not passed.

The plurality of instructions further comprise a function to perform a security audit on the application without user input, wherein the function to perform the security audit includes an instruction to input the executable code into the encryption code identification model and determine whether the executable code has passed a security test based on output data of the encryption code identification model, an instruction to perform a predefined process when the security test is not passed, and an instruction to record a security pass in a log of the application when the security test is passed, wherein the plurality of instructions further comprise an instruction to determine whether to perform the instruction to hook the loading of the executable code based on whether there is the security test passed within a time period.

In accordance with another aspect of the disclosure, an electronic device is provided. The electronic device includes a first processor, a storage storing an executable code of an application, a memory storing an executable code loaded from the storage and executed on the first processor, and a second processor in a sandbox environment, the second processor executing a plurality of instructions for determining whether loading of the executable code to the memory is allowed. The plurality of instructions may include an instruction to hook loading of the executable code from the storage to the memory, an instruction to input the executable code to an encryption code identification model, an instruction to control the encryption code identification model determining whether memory load of the executable code is allowed, and an instruction to block loading of the executable code to the memory when it is determined that memory load of the executable code is not allowed.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates an example of an access list according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

Terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
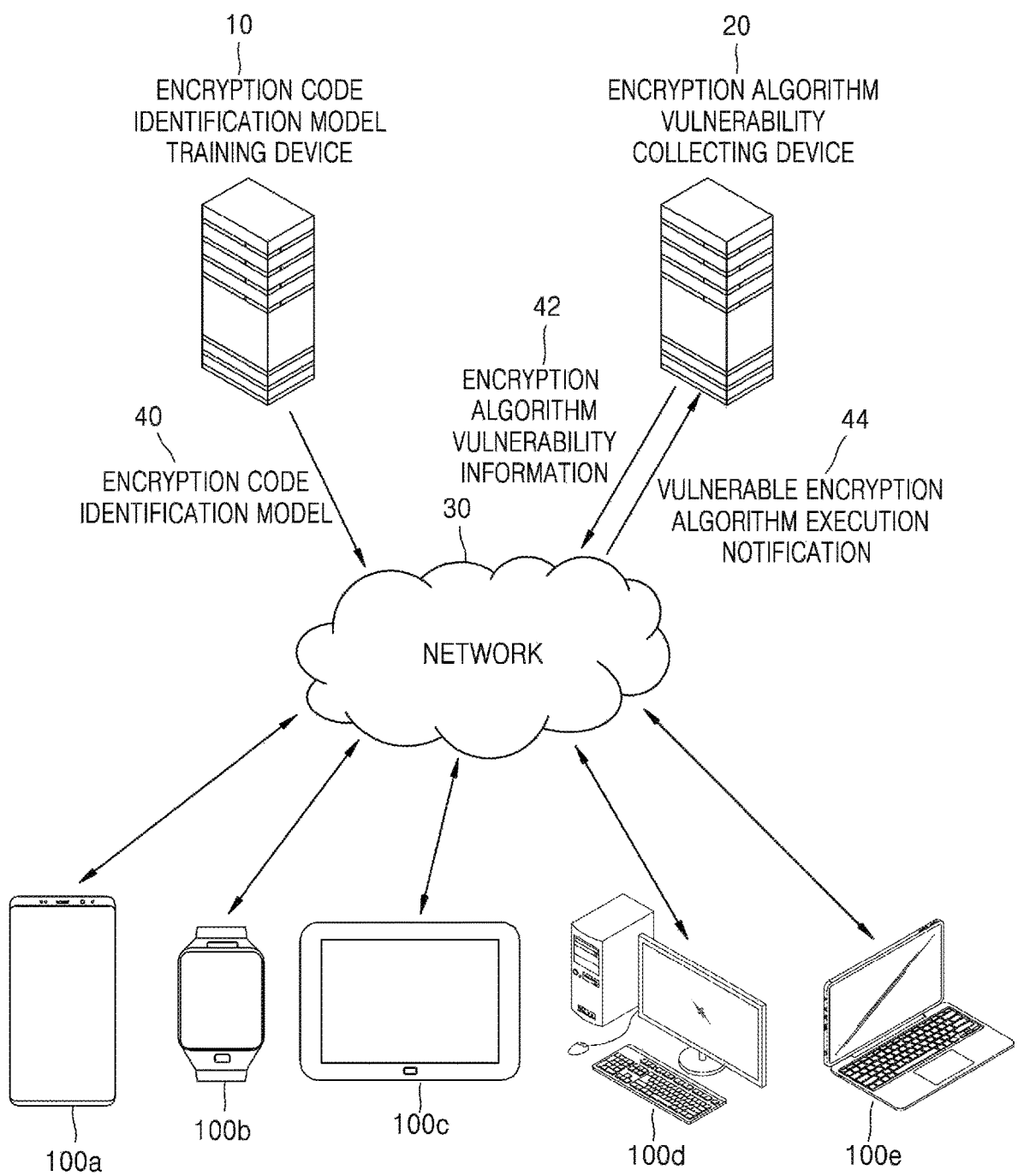
FIG. 1 is a block diagram of an encryption algorithm-based security enhancement system according to an embodiment of the disclosure.

FIG. 1 is a block diagram of an encryption algorithm-based security enhancement system according to an embodiment of the disclosure.

Referring to FIG. 1, a structure and operation of an encryption algorithm-based security enhancement system according to an embodiment of the disclosure will be described. The system according to the embodiment may include an encryption code identification model training device 10, an encryption algorithm vulnerability collecting device 20, and one or more electronic devices 100. For example, the electronic devices 100 include a mobile communication terminal 100a (i.e., a smartphone), a wearable device 100b (e.g., a smartwatch), a computing device 100c having a computing processor, a tablet 100d and a laptop 100e or a digital device having a computing unit. The electronic devices 100 may also be a server device providing a service to a user terminal.

The encryption code identification model training device 10 performs machine learning training by using training data which is a set of executable codes of an encryption algorithm. The training data may preferably include a plurality of different executable codes for one encryption algorithm. The training data may preferably include executable codes for a plurality of encryption algorithms. The encryption code identification model training device 10 may collect the executable codes, or may directly compile a distribution library including encryption algorithms to obtain the executable codes. The distribution library is, for example, OpenSSL or a pairing-based cryptography (PBC).

The machine learning training may be for generating a model for determining the presence of an encryption algorithm, or for generating a model that performs both the determination of the presence of an encryption algorithm and the classifying of an encryption algorithm type. The machine learning training may be performed by using various kinds of algorithms capable of generating a classification model, such as n-gram, a neural network, naive bayes, a support vector machine (SVM) or the like. In one embodiment, the types of encryption algorithm are divided into a plurality of different encryption algorithms specified in the internet engineering task force (IETF) and international organization for standards (ISO) standards, such as sha-256, aes-128-cbc, hmac-128, or the like.

The encryption code identification model training device 10 extracts feature data from executable codes of each type of encryption algorithm, and performs machine learning training by using the extracted feature data.

Hereinafter, a method of extracting the feature data will be described. Extraction of the feature data includes static analysis and dynamic analysis. In static analysis, feature data is extracted without executing an executable code of an encryption algorithm. On the other hand, in dynamic analysis, an executable code of an encryption algorithm is performed, and feature data is extracted by using a result of the execution. Hereinafter, static analysis and dynamic analysis for extracting feature data that may be performed in some embodiments of the disclosure will be described.

Through static analysis, an executable code of an encryption algorithm may be parsed to generate feature data related to a distribution of a previously designated keyword that characterizes the encryption algorithm. The keyword includes a string related to the encryption algorithm and a function name/library name related to the encryption algorithm.

Example strings include, for example, "hash", "digest", "encrypt", "key", "sk", "pk", "rk", "salt", and "seed". These strings are frequently used in an encryption algorithm, and thus is feature data that is used as a reference for identification/classification of an encryption algorithm.

The function name/library name includes at least one of, for example, "hash", "md5", "big number", "seed", "sorting", and "ordering". To implement an encryption algorithm, complex mathematical functions are to be imported and used. Therefore, the function name/library name as exemplified above also is feature data that is used as a reference for identification/classification of the encryption algorithm.

As a form of dynamic analysis, an executable code of an encryption algorithm may be executed in a security environment, and data related to power consumption of a central processing unit (CPU) during execution of a call sequence of a mathematical/logical operation function repeatedly called during the execution process and execution of the executable code may be extracted as the feature data. The encryption algorithm performs complex mathematical/logic operations iteratively. The mathematical/logical operation uses, for example, a system call such as add, multiplication, shift, XOR, AND, OR, NOR, and NAND. Thus, the call sequence of the repeated mathematical/logical operation function may also be feature data used as a reference in identification/classification of an encryption algorithm.

As another type of dynamic analysis, an executable code of an encryption algorithm may be executed in a security environment, and data related to power consumption of a CPU during execution of the executable code may be extracted as the feature data. As described above, an encryption algorithm involves repeatedly performed complex mathematical/logical operations, and thus, power consumption of the CPU will increase during the operations. Thus, data related to power consumption of a CPU during execution of an executable code of an encryption algorithm is also feature data used as a reference in identification/classification of an encryption algorithm.

The data related to power consumption of a CPU may be a number of CPU operation cycles in which a recorded amount of the power consumption of the CPU is equal to or greater than a previously designated numerical value. Some encryption algorithms are known to perform highly complex computations repeatedly. For example, Rivest-Shamir-Adleman (RSA), a public key-based encryption algorithm, repeats 1024-bit integer multiplication and modular operation 1024 times. Thus, a CPU executing an executable code of the RSA will record a high level of power consumption over 1024 operating cycles. Therefore, data related to the number of CPU operation cycles in which the CPU power consumption amount that is equal to or higher than a previously designated numerical value is recorded during execution of the executable code of the encryption algorithm may also be feature data used as a reference for identification/classification of an encryption algorithm.

A process in which the encryption code identification model training device 10 receives feature data to perform machine learning training is described above. The encryption code identification model training device 10 may extract feature data of an executable code by itself in a learning process by using a deep learning algorithm, and generate the encryption code identification model by using the extracted feature data.

The encryption code identification model training device 10 transmits an encryption code identification model 40 generated as a result of the machine learning training, to the electronic devices 100 via a network 30. The encryption code identification model 40 may include a set of parameters (machine learning (ML) parameters set) that define a model. The encryption code identification model training device 10 may update the encryption code identification model 40 by using training data that is updated periodically or non-periodically, and transmit the updated encryption code identification model 40 to the electronic devices 100.

The encryption algorithm vulnerability collecting device 20 collects and processes information about vulnerabilities of an encryption algorithm, thereby generating a vulnerability list including vulnerability information of each encryption algorithm type. The encryption algorithm vulnerability collecting device 20 may update the vulnerability list periodically or non-periodically and transmit the vulnerability list to the electronic devices 100.

The vulnerability information may include a score indicating vulnerability. The score may be set to be higher when the degree of vulnerability is high, for example, when an error is included in an encryption algorithm or when a serious security problem is caused in a system when a vulnerable encryption algorithm is executed.

The encryption algorithm vulnerability collecting device 20 may receive a vulnerable encryption algorithm execution notification 44 from an electronic device that executed a vulnerable encryption algorithm included in the vulnerability list. The encryption algorithm vulnerability collecting device 20 collects the vulnerable encryption algorithm execution notification 44 to generate statistical data, and may transmit the statistical data to a third party system such as a developer of an application (not shown) that uses the vulnerable encryption algorithm.

The statistical data may include the number of times that a vulnerable encryption algorithm has been executed. A time when the statistical data is sent to the third party system may be determined by reflecting both a vulnerability score of the vulnerable encryption algorithm and the above number of execution times. For example, with respect to a vulnerable encryption algorithm having a high vulnerability score, a statistical data notification condition may be set such that the statistical data may be transmitted when the number of execution times is one. When a vulnerable encryption algorithm has a low vulnerability score, a statistical data notification condition may be set such that the statistical data is transmitted when the number of times of execution is two, which is greater than the above number of times (one).

The electronic devices 100 may receive the encryption code identification model 40 and the vulnerable encryption algorithm vulnerability information 42, store the encryption code identification model 40 and the vulnerable encryption algorithm vulnerability information 42, and perform a security enhancement process according to a predefined setup or a user setup related to security. At least one of the encryption code identification model 40 and the encryption algorithm vulnerability information 42 may be referred to during the operation related to security enhancement.

Hereinafter, embodiments of the operation related to security enhancement of the various electronic devices 100 will be described with reference to FIGS. 2A and 2B.

Figure 2A:
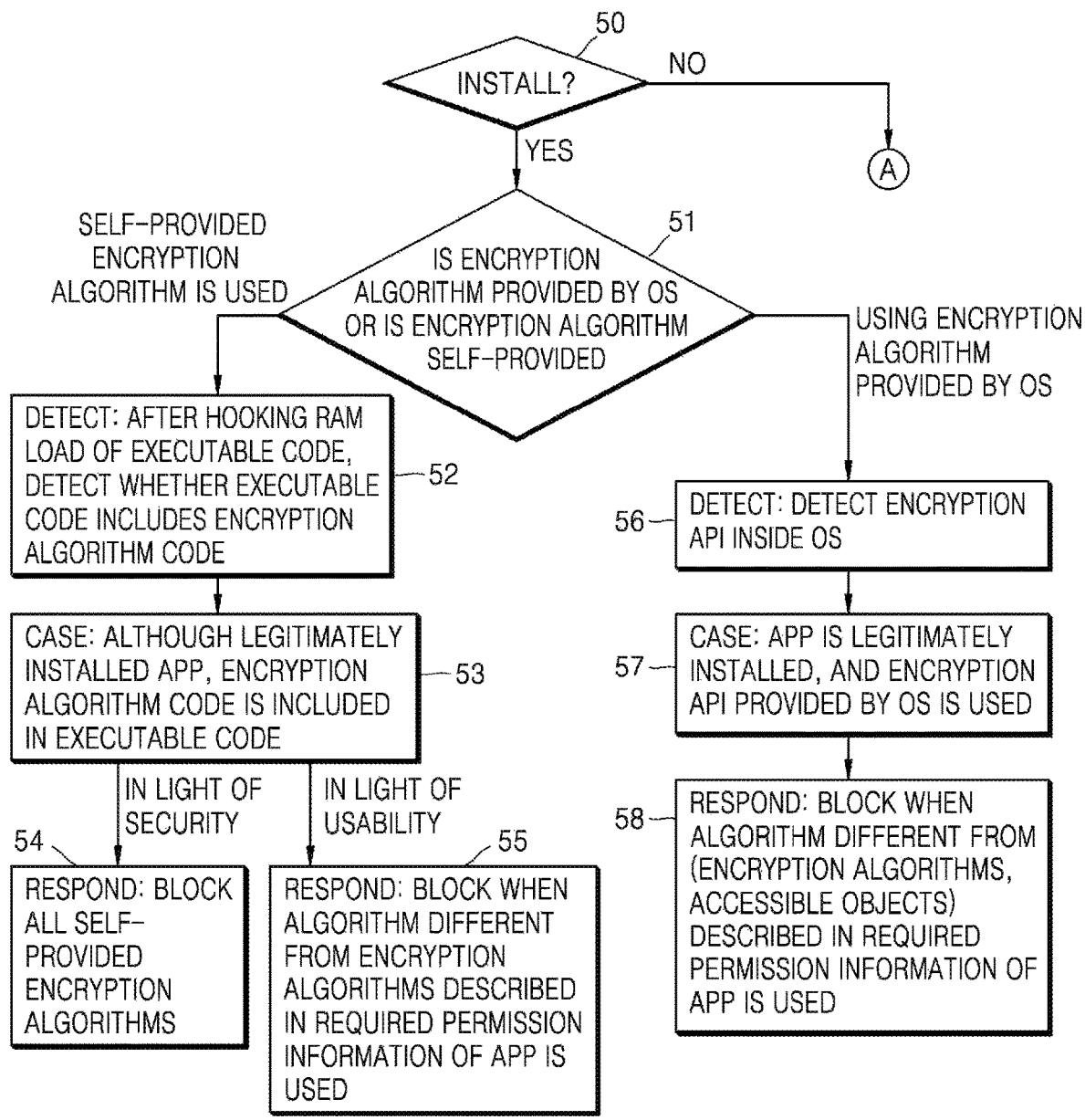
FIGS. 2A and 2B are views for describing operations related to security enhancement for each case according to various embodiments of the disclosure.
Figure 2B:
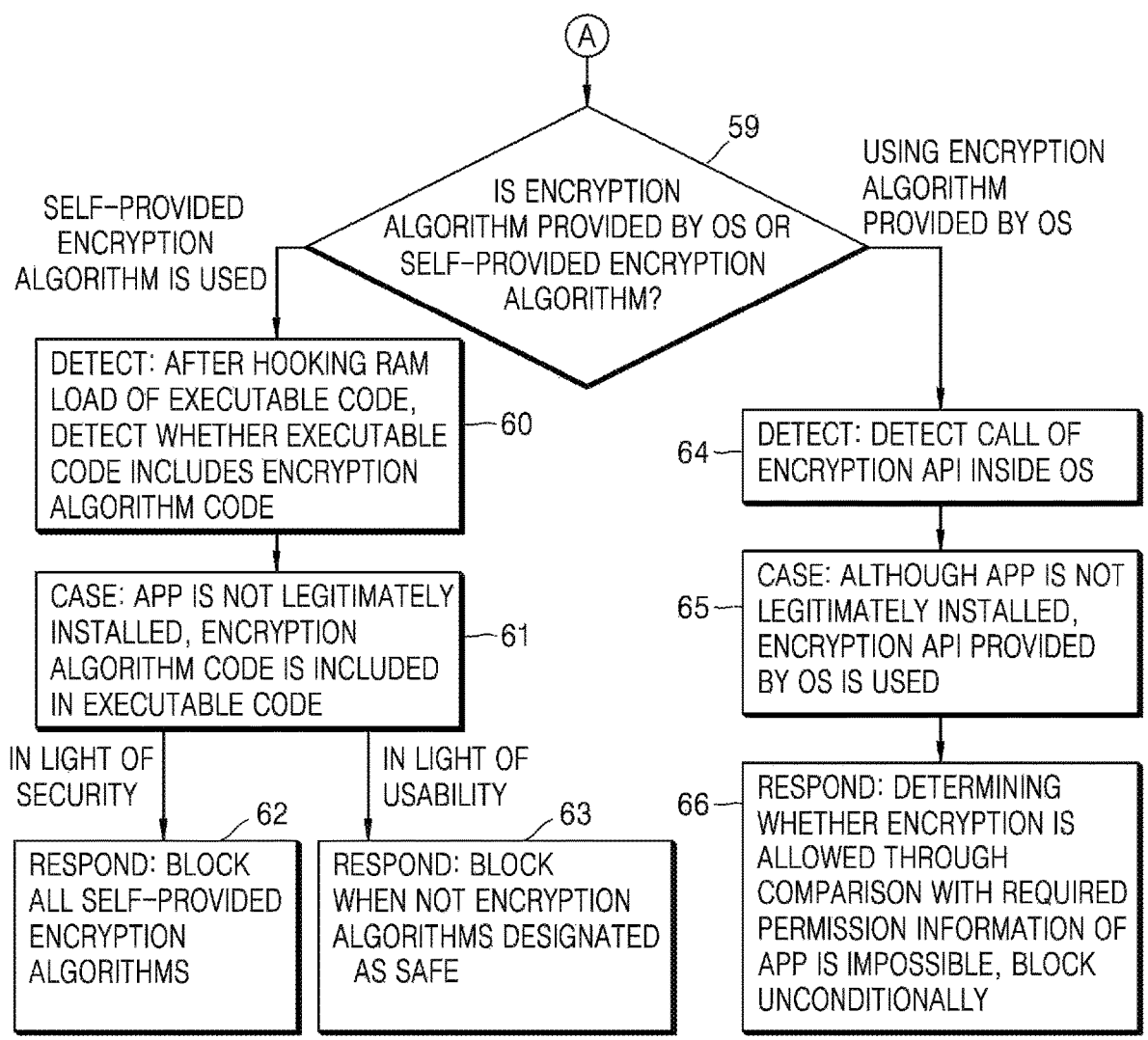

FIGS. 2A and 2B are views for describing operations related to security enhancement for each case according to various embodiments of the disclosure.

Referring to FIGS. 2A and 2B, an example method that determines whether an application is legitimately installed by an installer at reference numeral 50. There are two different examples described. In the first example, the encryption algorithm is executed based on encryption algorithm that is called by the application (e.g., using an application programming interface (API), etc.). In the second example, the application may implement an algorithm itself. In the application, the applications are executed at the user level.

Referring to FIG. 2A, cases to be considered when an application is installed legitimately by an installer will be described.

When an executable code of an application legitimately installed by an installer includes an executable code of an encryption algorithm, and accordingly, the encryption algorithm of the application is executed, loading of the executable code of the application into a memory (RAM) is hooked, and the executable code including the executable code of the encryption algorithm is detected by using an encryption code identification model. That is, at reference numeral 51, the method determines whether the application uses an encryption algorithm is provide by an operating system (OS) or an algorithm implemented by the application. When the algorithm is algorithm implemented by the application, the method hooks the executable code of the application and determines the encryption algorithm in the application at reference numeral 52.

The hooking is a concept encompassing various methodologies for temporarily holding execution of a target routine to be controlled and for executing a particular routine.

For example, the hooking may refer to executing a particular routine before a target routine to be controlled is executed. In some embodiments of the disclosure, the target routine may be a system function (or a kernel function) in which a binary code is loaded to a memory. In order to set the hooking, an operation of registering a hooking function with respect to a routine which is an object to be hooked may be required. When registration of the hooking function is successful, before the routine to be hooked is executed, the hooking function is executed. Thus, the routine to be hooked will not be executed unless an internal routine of the hooking function returns. Thus, when a routine to be hooked is a memory load system function, after determining whether the hooking function allows memory load, when memory load is allowed, the memory load may be allowed by transmitting a parameter of the memory load system function that is introduced into the hooking function to the memory load system without change. When not allowing memory load, the parameter may not be transmitted to the memory load system function, or the memory load system function is not at all executed to block the memory load.

Here, when an executable code of an application includes an executable code of an encryption algorithm, when the application is executed at reference numeral 53, the electronic device may respond by unconditionally blocking a memory load of the application in a bid to enhance security at reference numeral 54, or in a bid to provide usability of a reasonable level, the electronic device may respond by blocking memory load of the application only when an encryption algorithm different from available encryption algorithms described in required permission information (for example, a manifest file) is detected by using the encryption code identification model at reference numeral 55.

When calling an encryption API is detected at reference numeral 56, in which an application legitimately installed by an installer is provided, the encryption API is called by an operating system at reference numeral 57, and an internal routine of a function executed by the encryption API is executed. Here, as a parameter of the encryption API, a type of an encryption algorithm and data to be encrypted may be designated, and accordingly, information about the type of the encryption algorithm and the data to be encrypted are introduced into the internal routine of the function. By using the introduced information, an encryption attempt beyond the required rights identified by the user may be blocked when the application is installed at reference numeral 58.

For example, while only encryption algorithm types A and B are allowed according to the required rights, when encryption algorithm type C is appointed as a parameter of the encryption API, operation of the encryption API may be blocked. Also, while only contacts are appointed as accessible objects in the required rights, when photo image data is designated as a parameter of the encryption API, operation of the encryption API may be blocked. In addition, operation of an encryption API, for which a parameter that is outside at least one of an encryption algorithm type and an accessible object included in the required rights is designated, may be blocked.

Referring to FIG. 2B, corresponding to an example in which an application is installed not legitimately by an installer will be described.

When an executable code of an application that is not legitimately installed by an installer includes an executable code of an encryption algorithm and accordingly, a self-provided encryption algorithm is executed at reference numeral 61, loading of the executable code of the application to a RAM is hooked, and the executable code including the executable code of the encryption algorithm is detected by using an encryption code identification model at reference numeral 60. Here, in a bid to enhance security, the electronic device may respond by unconditionally blocking memory load of the application at reference numeral 62 or by blocking memory load of the application when a type of the encryption algorithm detected is not a safe encryption algorithm type at reference numeral 63.

The safe encryption algorithm type may include an encryption algorithm type included in a white list stored in the electronic device, an encryption algorithm type not included in a vulnerable list described with reference to FIG. 1, or an encryption algorithm type having a vulnerability score equal to or less than a reference value according to the vulnerability list.

Though an application that is not legitimately installed by an installer, when calling an encryption API provided by an operating system at reference numeral 65, an internal routine of a function is executed when the encryption API is called is executed, and calling of the encryption API is detected at reference numeral 64. However, unlike when an application is legitimately installed by an installer, a scope to allow access with respect to an application that is not legitimately installed is not known. Thus, when an application that is not legitimately installed by an installer calls an encryption API provided by an operating system, the electronic device may respond by unconditionally blocking operation of the encryption API at reference numeral 66.

Figure 3:
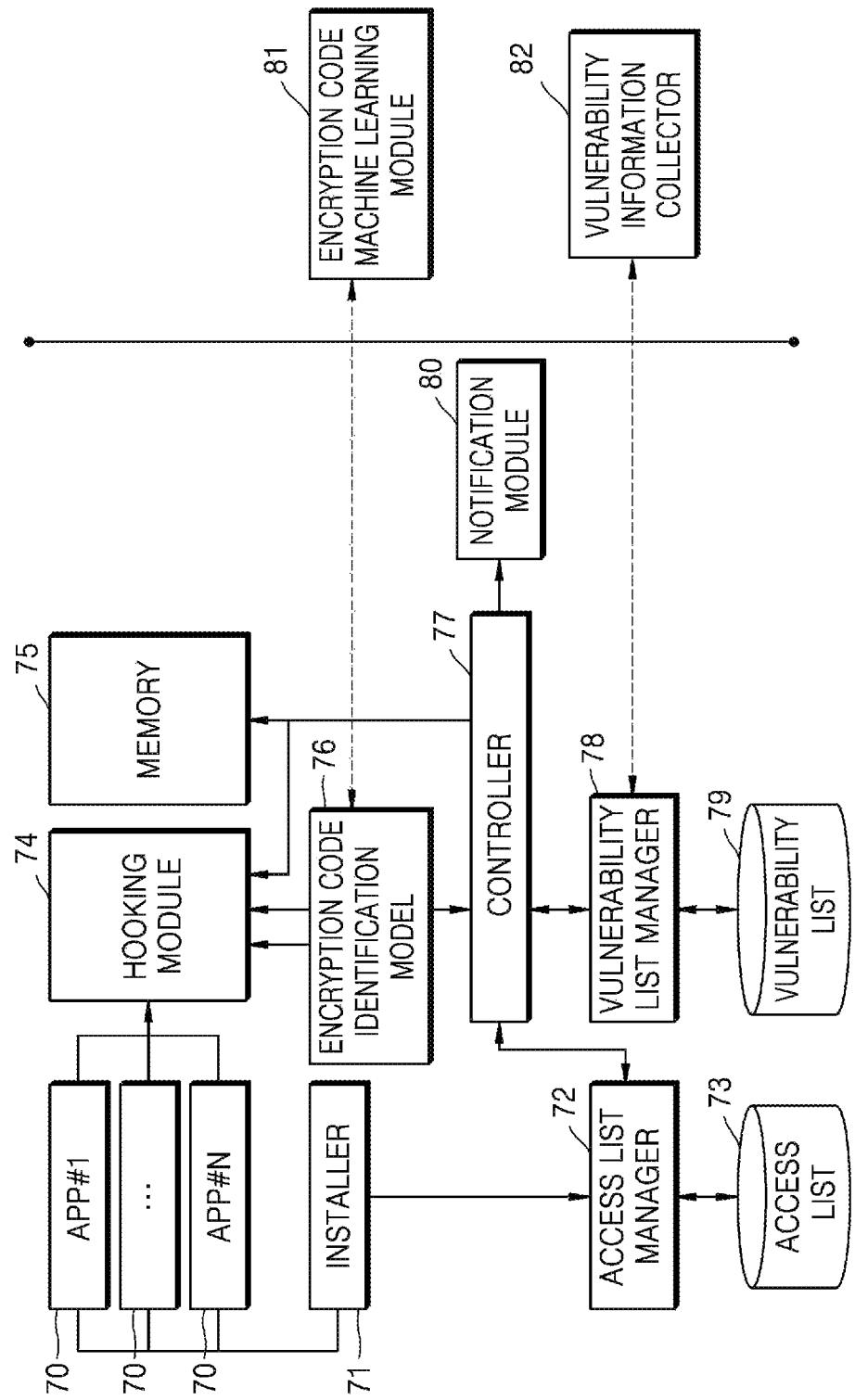
FIG. 3 is a block diagram of a security enhancement system according to an embodiment of the disclosure.

FIG. 3 is a block diagram of a security enhancement system according to an embodiment of the disclosure.

Referring to FIG. 3, a structure of a security enhancement system according to another embodiment of the disclosure will be described. The security enhancement system includes a client part and a server part. FIG. 3 illustrates modules respectively indicating logical operation units. Hereinafter, the modules will be described in an order that the modules are respectively operated.

When an application 70 is installed on a client part by an installer 71, the installer 71 obtains information about a type of an encryption algorithm to be used, accessible objects, or the like from application's required permission information (for example, a manifest file) included in an installation package of the application 70, and stores the information in an access list 73 via an access list manager 72. As a result, information about types of available encryption algorithms and accessible objects may be stored in the access list 73 according to each application.

Before a system function used for the application 70 is loaded into the memory 75 and executed, a hooking module 74 is first executed. The hooking module 74 allows an executable code of the application 70 to be executed in a security environment, and configures input data about an encryption code identification model 76 by using a result of execution of the executable code.

The encryption code identification model 76 may be obtained by machine learning by using the encryption code machine learning module 81 on the server part. That is, the encryption code identification model 76 may be downloaded from the server part to the client part. The encryption code identification model 76 may also be stored on the client part.

Output data of the encryption code identification model 76 may include data about a type of an encryption algorithm included in the executable code. The controller 77 may receive the output data, and determine whether to allow memory load of the application 70 being held by the hooking module 74. For example, the controller 77 may determine to allow the memory load by determining whether a type of an encryption algorithm included in the executable code complies with the application access rights stored in the access list 73 or determining whether an encryption algorithm type included in the executable code is a vulnerable encryption algorithm included in a vulnerability list 79 accessible via a vulnerability list manager 78. The vulnerability list 79 may include vulnerable encryption algorithm information downloaded from a vulnerability information collector 82 of the server part.

When the controller 77 determines not to allow the memory load, the executable code of the application 70 is not loaded to the memory 75. That is, the hooking module 74 ends its execution without returning a control to the hooked memory load system function. In addition, a notification module 80 notifies a client user related to execution of an unsuitable encryption algorithm or notifies the server part. On the other hand, when the controller 77 determines to allow the memory load, the executable code of the application 70 is loaded to the memory 75. That is, the hooking module 74 ends its execution by returning a control to the hooked memory load system function.

Hereinafter, a structure and operation of an electronic device according to an embodiment of the disclosure will be described with reference to FIGS. 4, 5, 6, 7, and 8.

In an embodiment, an electronic device in which an instruction for performing a security enhancement-related operation and an executable code of an application are executed on a same processor is provided.

Figure 4:
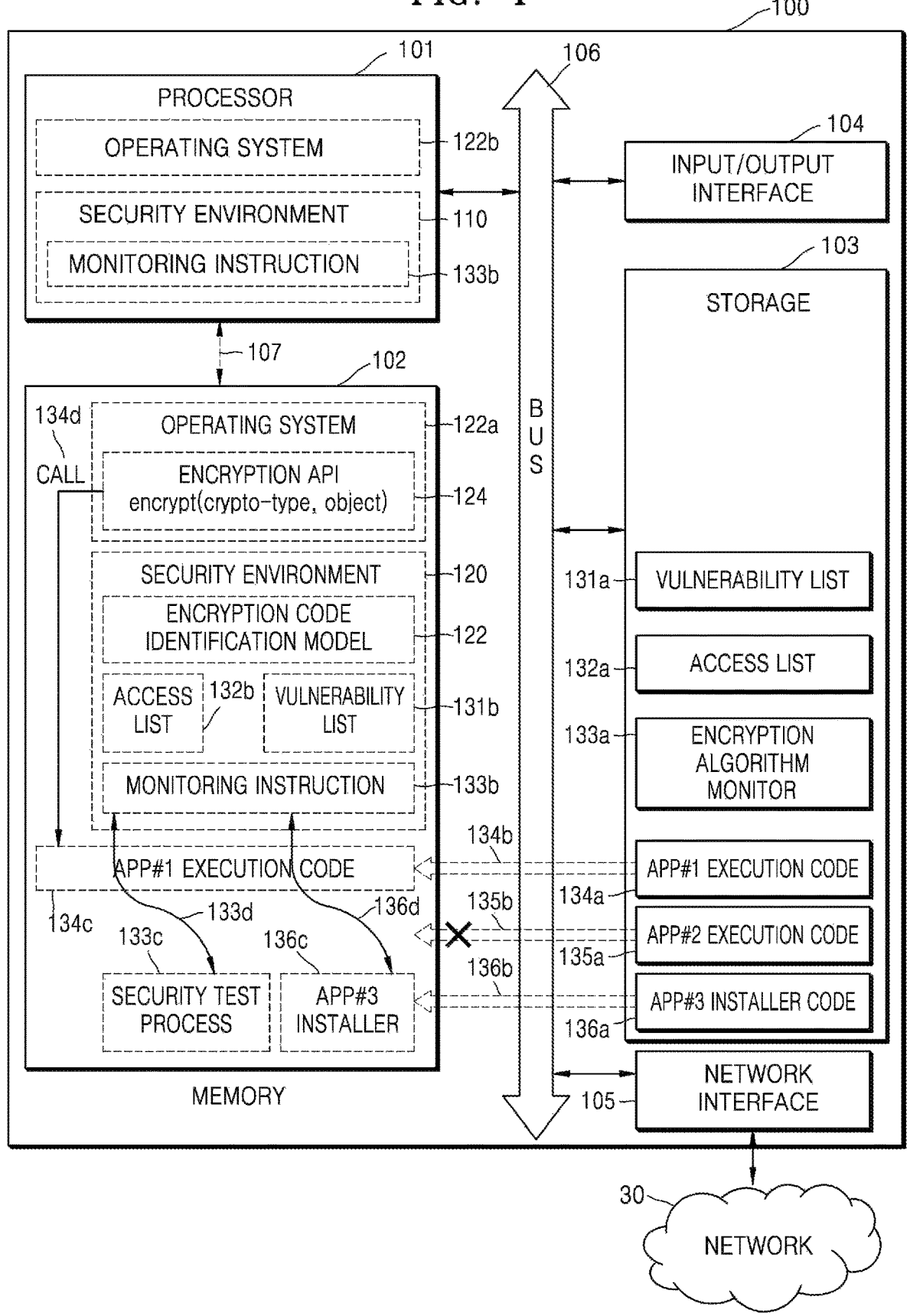
FIG. 4 is a block diagram of an electronic device according to an embodiment of the disclosure.

FIG. 4 is a block diagram of an electronic device according to an embodiment of the disclosure.

Figure 8:
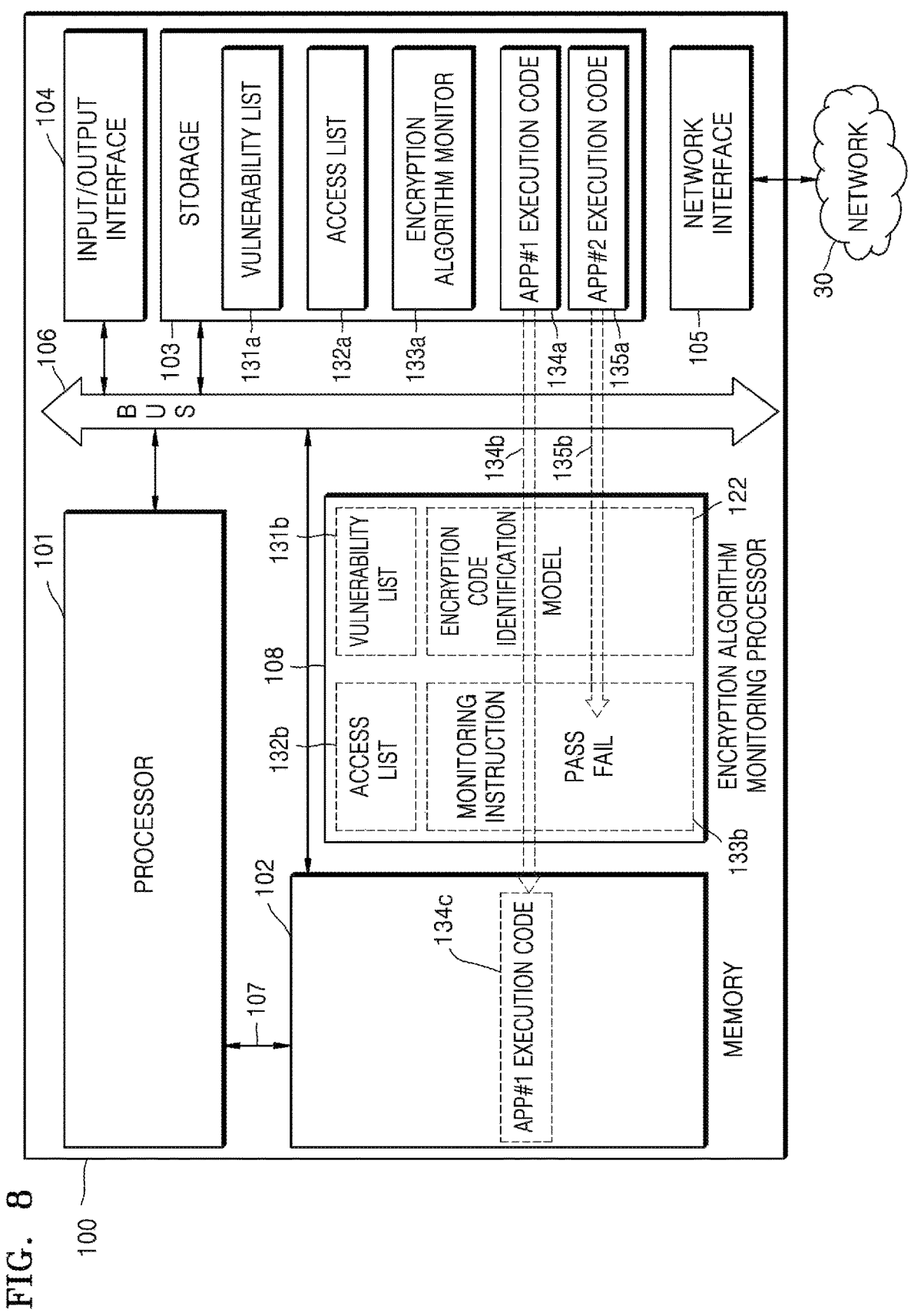
FIG. 8 is a block diagram of an electronic device according to an embodiment of the disclosure.

Referring to FIG. 4, an electronic device in which an instruction for performing a security enhancement-related operation and an executable code of an application are executed on different processors is provided. Another example of the structure of the electronic device according to the embodiment is illustrated in FIG. 8.

In the specification, an instruction refers to a set of commands which are bundled according functions and executed on a processor.

First, a structure and operation of the electronic device according to the embodiment will be described with reference to FIG. 4.

Referring to FIG. 4, the electronic device 100 according to the embodiment includes a processor 101, a memory 102, and a storage 103. The electronic device 100 may further include an input/output interface 104 for receiving a user input for, for example, execution of an application, and providing an output of a video or an audio, and a network interface 105 connected to the network 30. A system bus 106 functions as a data transmission and reception path between the processor 101, the memory 102, the input/output interface 104, and the storage 103. The memory 102 may be a volatile data storage device such as a RAM. The storage 103 may be a data storage device such as a nonvolatile memory (e.g., a flash memory) or a hard disk.

The storage 103 may store a vulnerability list 131a and an access list 132a. The vulnerability list 131a is included in encryption algorithm vulnerability information received by using an encryption algorithm vulnerability collecting device. The access list 132a may be obtained by matching and storing identification information of applications and available encryption algorithms, or may be obtained by matching and storing identification information of applications, available encryption algorithms, and accessible objects as illustrated in FIG. 7.

The storage 103 may store an encryption algorithm monitoring program 133a. The encryption algorithm monitoring program 133a includes an executable code including a plurality of instructions, and the executable code is loaded to and stored in the memory 102.

The memory 102 loads an executable code (or a binary code) stored in the storage 103. The processor 101 fetches an instruction stored in the memory 102 and executes the instruction. The processor 101 may receive an instruction stored in the memory 102, via the system bus 106.

Data associated with an operating system installed on the electronic device 100 is loaded to the memory 102 when the electronic device 100 is booted. FIG. 4 illustrates an operating system-related instruction 122a related to the operating system loaded to the memory 102. The operating system-related instruction 122a is executed on the processor 101. As described above, the operating system may include an encryption API 124. The application may execute a data encryption function provided by the operating system by calling the encryption API 124.

A security environment 110 may be implemented on the processor 101. The processor 101 may cause a program to be executed inside the security environment 110 which cannot access external resources. That is, the security environment 110 may be implemented in a sandbox manner.

Also, a security environment 120 may be implemented in the memory 102. The security environment 120 of the memory 102 may refer to an address area not accessible by an application executed at a user level. That is, the security environment 120 may be configured in a secure element (SE) manner. It is to be noted that unlike FIG. 4, the security environment 120 may also be configured by using an additional storage unit (not shown) such as a subscriber identification module (SIM) card.

An instruction included in the security environment 120 of the memory 102 may be immediately provided to the processor 101 via a processor-memory bridge 107. Accordingly, the monitoring instruction 133b included in the security environment 120 may be protected from being replaced, without permission, by an instruction of a hacking program attempting to disable security enhancement techniques according to embodiments of the disclosure. Output data of an instruction executed in the security environment 110 of the processor 101 may also be stored in the security environment 120 of the memory 102 via the processor-memory bridge 107. Accordingly, execution output data of the monitoring instruction 133b may be protected from being changed by the hacking program without permission.

In the security environment 120 of the memory 102, the access list 132a stored in the storage 103 may be loaded at reference numeral 133b, and the vulnerability list 131a stored in the storage 103 may be loaded at reference numeral 131b, and an encryption code identification model 122 is received from an encryption code identification model training device. As the monitoring instruction 133b, the vulnerability list 131b, which may be used by the monitoring instruction 133b, and the encryption code identification model 122 are all stored in the security environment 120, blocking or changing of operation of the monitoring instruction 133b by the hacking program may be prevented.

An executable code included in the encryption algorithm monitoring program 133a may be loaded to the security environment 120 of the memory 102 from the storage 103 at the time of booting of the electronic device 100 and stored, and may be in a constantly executed state in a background mode in the security environment 110 of the processor 101. In an embodiment, the monitoring instruction 133b may be loaded not to the storage 103 but to a read only memory (ROM) (not shown), thereby being protected from the hacking program more safely.

In an embodiment, the electronic device 100 hooks loading of an executable code to the memory 102, executes the executable code in the security environment 110, and configures input data to be input into the encryption code identification model 122 by using a result of the execution.

When the encryption code identification model 122 is obtained by machine learning by using feature data extracted from an executable code of an encryption algorithm, the input data may include the feature data extracted by using a result of execution of the executable code. On the other hand, when the encryption code identification model 122 is obtained by deep learning performed by using, as a data set, at least one of a result of execution of an executable code of an encryption algorithm and the executable code itself, the input data may include at least one of the execution result of the executable code and the executable code itself.

Hereinafter, description will be based on the assumption that the feature data is input into the encryption code identification model 122 for better understanding. However, it is to be noted that the scope of the disclosure encompasses input data of all types that reflect an execution result of an executable code of an encryption algorithm and are input into the encryption code identification model 122.

When feature data of the executable code is extracted and the feature data is input into the encryption code identification model 122, and whether memory load of the executable code is allowed is determined by using output data of the encryption code identification model, and when it is determined not to allow the memory load of the executable code, the executable code is blocked from being loaded to the memory 102. Hereinafter, the embodiment will be described with respect to APP(application) #1 134a and APP #2 135a, executable codes of which are stored in the storage 103.

When an execution manipulation for APP #2 is input via the input/output interface 104, an operating system 122b controls the electronic device 100 such that an executable code 135a of APP #2 is loaded to the memory 102. The monitoring instruction 133b hooks the executable code 135a of APP #2 before the executable code 135a of APP #2 is loaded to and stored in the memory 102.

The hooking of the monitoring instruction 133b may be performed, for example, by hooking a system call such as EXEC( ) which executes a program or by inserting a jump instruction to the monitoring instruction 133b before a section for performing a memory loading operation of internal logic of the system call.

Figure 5:
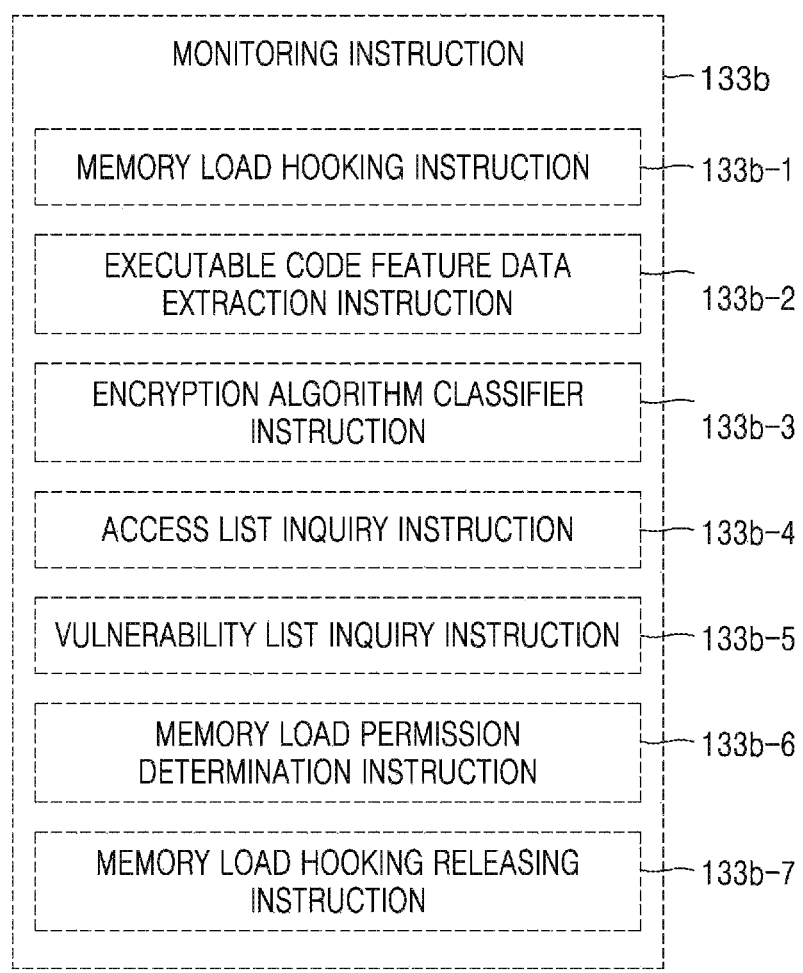
FIG. 5 is a block diagram of monitoring functions according to an embodiment of the disclosure.

FIG. 5 is a block diagram of monitoring functions according to an embodiment of the disclosure.

Referring to FIG. 5, due to the hooking, the executable code 135a of APP #2 is not loaded to the memory 102 until the monitoring instruction 133b commands a return to the program execution system call again. After having held memory loading of the executable code 135a of APP #2 as described above, the monitoring instruction 133b executes an instruction to determine whether to allow memory loading of the executable code 135a of APP #2. Examples of instructions that are executable here are illustrated in FIG. 5. A memory load hooking instruction 133b-1 for performing the hooking is also illustrated in FIG. 5.

Meanwhile, when a test is performed while the memory load hooking instruction 133b-1 has hooked the memory load of all executable codes and memory loading is held, and the hooking is released to allow memory loading to be performed when no problem is found as a result of the test, then the overall operating speed of the electronic device 100 may be excessively slow. In an embodiment, within a range not damaging the purpose of security enhancement, some executable codes may be exempt from memory load hooking to prevent excessive slowdown of the operating speed of the electronic device 100. Hereinafter, an embodiment regarding the above will be described.

Whether to perform hooking on an executable code of an application may be determined based on at least one of whether the executable code of the application is included in a white list, a number of times of executing the executable code, and a period of time passed after installation or update of the application of the executable code. When an executable code of an application is included in a white list, which is a list of executable codes, safety of which is confirmed, the executable code may preferably be exempt from hooking. In addition, the higher the number of times an application is executed, the more likely that the application is a general-use application having high stability, and thus, applications that are executed a greater number of times may preferably be exempt from hooking. If not much time has passed after installing or updating an application, it is highly likely that a security test according to the embodiment is not performed on the application. Thus, the longer the period of time after installation or update of an application, the application may preferably be exempt from hooking. Whether hooking is exempt or not may also be performed by collectively reflecting at least some of the above-described factors used for determining.

In addition, whether to hook the executable code may also be determined based on whether an installation history regarding an application is. An application that is not legitimately installed on an electronic device may be regarded as being more highly likely to be a malicious program compared to a legitimately installed application. Thus, memory loading of the executable code may be hooked only when there is no installation history of an application of the executable code, and when there is an installation history of the application of the executable code, the executable code may be exempt from memory load hooking.

Figure 6:
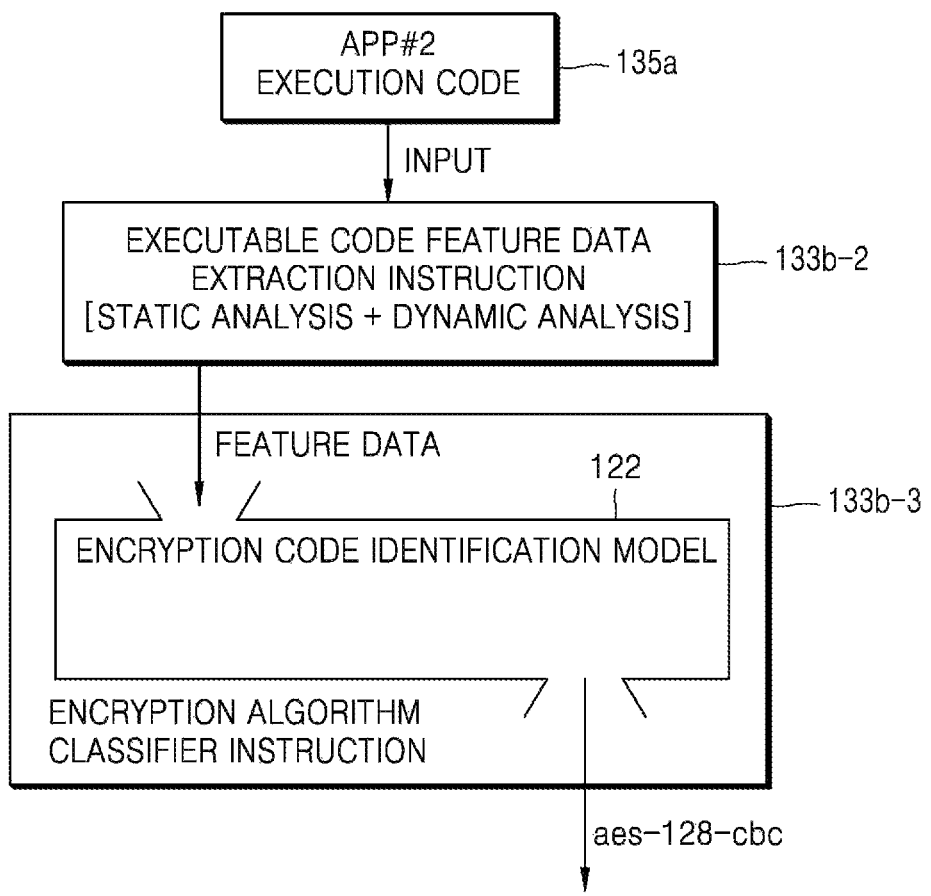
FIG. 6 is a view for describing an operation in which an electronic device identifies an encryption algorithm included in an executable code of an application according to an embodiment of the disclosure.

FIG. 6 is a view for describing an operation in which an electronic device identifies an encryption algorithm included in an executable code of an application according to an embodiment of the disclosure.

Referring to FIG. 6, after the hooking, an executable code feature data extraction instruction 133b-2 and an encryption algorithm classifier instruction 133b-3 are executed with respect to the executable code 135a of APP #2. Referring to FIG. 6, the executable code feature data extraction instruction 133b-2 may execute the executable code 135a of APP #2 in the security environment 110, and extract feature data based on a result of the execution.

Unlike FIG. 6, it is to be noted that feature data of the executable code 135a of APP #2 may also be extracted from the inside of the encryption code identification model 122. For example, when the encryption code identification model 122 is generated by deep learning-based machine learning, feature data of the executable code 135a of APP #2 may be extracted from the inside of the encryption code identification model 122. Here, the encryption code identification model 122 may include a plurality of convolutional neural network (CNN) layers. Here, the encryption code identification model 122 may directly receive the executable code 135a of APP #2.

As described above, the security environment 110 may be a sandbox environment. As the code feature data extraction instruction 133b-2 executes the executable code 135a of APP #2 in a sandbox environment, even when encryption related logic that may adversely affect the executable code 135a of APP #2 is contained in the executable code 135a of APP #2, a result of execution of the encryption related logic does not affect system resources outside the sandbox environment. Thus, encryption of data of the electronic device 100 such that the data cannot be decrypted due to execution of the executable code 135a of APP #2 for extraction of feature data may be prevented.

It has been described above with reference to FIG. 1 that the encryption code identification model 122 is configured by using data received from the encryption code identification model training device 10. The executable code feature data extraction instruction 133b-2 may also preferably perform feature data extraction in a same manner as the encryption code identification model training device 10. Thus, an operation related to feature data extraction of the executable code feature data extraction instruction 133b-2 will be apparent by referring to the description of extraction of feature data of the encryption code identification model training device 10.

The encryption algorithm classifier instruction 133b-3 inputs the feature data into the encryption code identification model 122, and determines whether to allow memory load of the executable code 135a of APP #2 by using output data of the encryption code identification model.

As illustrated in FIG. 6, an operation of the electronic device 100 that is performed when it is determined that an executable code of an encryption algorithm aes-128-cbc is included in the executable code 135a of APP #2 will be described, and for better understanding, the four cases to be considered, which are introduced with reference to FIGS. 2A and 2B will be mentioned here.

When APP #2 is installed on an electronic device by execution of an installer according to user manipulation, since an executable code of the encryption algorithm aes-128-cbc is included in the executable code 135a of APP #2, this corresponds to case 53 of FIG. 2A. Here, as described above, since the executable code of the encryption algorithm is included, memory load of the encryption algorithm of APP #2 may be unconditionally blocked at reference numeral 54, or when APP #2 does not have execution rights for the encryption algorithm aes-128-cbc according to the access list 132b, memory load of the executable code 135a of APP #2 may be blocked (55). According to the access list 132b illustrated in FIG. 7, the only executable encryption algorithm for APP #2 is RSA, and thus, the executable code 135a of APP #2 cannot be loaded to a memory.

In an embodiment, the electronic device may block memory load only when an installation record of the APP #2 is not found. In this case, since APP #2 is installed in the electronic device by execution of an installer, an installation record will be found, and thus, memory load of APP #2 will not be blocked.

Referring back to FIG. 5, various monitoring function are illustrated. For example, an access list inquiry instruction 133b-4 may access contents of the access list 132b, a memory load permission determination instruction 133b-6 may determine whether memory load of an executable code of an application is allowed according to a predefined setting or security-related user setting, and a memory load hooking releasing instruction 133b-7 may release the hooking when memory load is to be allowed.

Referring back to FIG. 6, when APP #2 has execution rights for the encryption algorithm aes-128-cbc, when aes-128-cbc is included in the vulnerability list 131b, memory load of the executable code 135a of APP #2 may be blocked based on vulnerability of aes-128-cbc (55). FIG. 5 illustrates a vulnerability list inquiry instruction 133b-5 for inquiring contents of the vulnerability list 131b.

When APP #2 is not installed in the electronic device by execution of an installer according to user manipulation, and only the executable code 135a of APP #2 is received from an external device through the network interface 105, and stored in the storage 103, and execution is attempted by using execution rights acquired by maliciously exploiting a security vulnerability, since the executable code of the encryption algorithm aes-128-cbc is included in the executable code 135a of APP #2, this corresponds to case 61 of FIG. 2B. Here, as described above, since the executable code of the encryption algorithm is included, memory load of the executable code of APP #2 may be unconditionally blocked (62), or when aes-128-cbc is not registered as a 'safe encryption algorithm' described in the specification, memory load of the executable code 135a of APP #2 may be blocked (63).

Referring back to FIG. 4, the loading of the executable code 135a of the APP #2 from the storage 103 to the memory 102 at reference numeral 135b is blocked by the monitoring instruction 133b. Unlike APP #2, APP #1 may be loaded at reference numeral 134b and stored at reference numeral 134c in the memory 102 normally because APP #1 is an application that does not perform encryption.

In an embodiment, the electronic device 100 automatically performs a security test related to an encryption algorithm during installation of an application. Hereinafter, the embodiment will be described with respect to an installer execution code 136a of APP #3.

The installer execution code 136a of APP #3 is loaded to (136b) and stored in the memory 102. An installer 136c loaded to the memory 102 for execution may configure an executable code of APP #3, and add an identifier of APP #3, available encryption algorithms, and accessible objects to the access list 132b by using required permission information of APP #3 included in an installation package (not shown) of APP #3.

The installer 136c automatically executes the monitoring instruction 133b also without user manipulation at reference numeral 136d when an installation-related operation is completed. The monitoring instruction 133b executes an executable code of APP #3 configured by the installer 136c, in a security environment, and extracts feature data of the executable code by using a result of the execution, and inputs the feature data into the encryption code identification model 122, and determines whether the executable code of APP #3 passed a security test by using output data of the encryption code identification model 122.

The monitoring instruction 133b may determine that the executable code failed in passing the security test when an encryption algorithm indicated by output data of the encryption code identification model 122 does not match with information about an available encryption algorithm obtained from the application's required permission information included in an installation package of the application. The encryption algorithm indicated by output data of the encryption code identification model 122 not matching the available encryption algorithm means that there is an executable code of another encryption algorithm that is not notified to the user, in the executable code of APP #3. Thus, in this case, it may be preferable not to finish installation of APP #3 in a normal manner.

When a failure is determined by determining whether the security test has passed the security test, the monitoring instruction 133b performs a previously designated process on APP #3. The previously designated process may be, for example, providing a notification of the test failure to the installer 136c such that the installer 136c takes action such as uninstalling, or directly removing or scrambling the executable code performed by the monitoring instruction 133b to disable execution.

In an embodiment, the electronic device 100 may perform a pretest on encryption function stability of an application based on a result of identification of an encryption algorithm included in an executable code of the application. The frequency of the pretest may be differed according to an application type. That is, a security test process may be performed on a first type of application at a first frequency without user manipulation for executing the first type of application, and a security test process may be performed on a second type of application at a second frequency without user manipulation for executing the second type of application.

In an embodiment, it is likely that an application of a type with a high execution frequency is more important, and thus, the frequency of the pretest may also be high. In another embodiment, an application having an icon placed on a background screen of a default page is also likely to be important, and thus the frequency of the pretest may also be high.

The embodiment, in which slowdown of an operating speed of the electronic device 100 is prevented as memory load hooking is exempt within a range in which there is no damage to the purpose of security enhancement, has been described above. Applications that passed the pretest may be exempt from memory load hooking for a certain period in which a test result is valid.

The security test process may be executed by a security test process instruction 133c. The security test process instruction 133c manages a test period (for example, a daily test, a weekly test, etc.) and selects an application to be a subject of a test based on a test period. The security test process instruction 133c calls the monitoring instruction 133b to perform a test on the selected application. As described above, the monitoring instruction 133b determines whether the executable code has passed a security test. Regarding applications that have not passed the security test, measures such as user notification, deactivation, black list registration, forcible removal or the like may be automatically taken.

FIG. 7 illustrates an example of an access list according to an embodiment of the disclosure.

Referring to FIG. 7, the electronic device 100 detects an encryption attempt beyond the access rights approved for an application and blocks the attempt. By describing based on the access list 132b of FIG. 7, when APP #1 calls an encryption API and attempts encryption by using RSA algorithm (by using unavailable encryption algorithm), or when APP #2 attempts encryption of contacts by using RSA algorithm (encryption of inaccessible objects), or when APP #3 attempts encryption of a file by using RSA algorithm (encryption of inaccessible object by using an unavailable encryption algorithm), the electronic device 100 may block these attempts. Hereinafter, an operation of the electronic device 100 when APP #3 calls an encryption API to encrypt a picture by using sha-256 algorithm.

The APP #3 installer 136c obtains information about an available encryption algorithm and accessible objects from application's required permission information included in an installation package of an application (for example, a manifest file), and matches identification information of the application, available encryption algorithms, and accessible objects and stores them in the access list 132a. The access list 132a is verified periodically or non-periodically and then loaded to the security environment 120.

APP #3 is executed, and the encryption API 124 is called by APP #3. By executing the internal logic of the encryption API 124, whether (encryption algorithm sha-256, encryption object) according to call of the encryption API 124 is within the access rights of APP #3 is determined by using the access list 132b. While APP #3 has rights for encrypting contacts or files by using hmac-128 algorithm and sha-256 algorithm, since an encryption API is called to encrypt pictures by using sha-256 algorithm, the encryption API 124 blocks execution of an encryption-related routine. Here, the encryption API 124 may display a message regarding blocking of execution of an encryption-related routine.

In an embodiment, the encryption API 124 checks the vulnerability list 131b for a vulnerability of an encryption algorithm appointed by a parameter, and may determine whether to execute an encryption-related routine based on information about vulnerability obtained from the checking. That is, even when (encryption algorithm [sha-256], encryption object) according to the call of the encryption API 124 is within the access rights of APP #3, since vulnerability information about sha-256 algorithm is included in the vulnerability list 131b and a vulnerability score exceeds a reference value, execution of sha-256 algorithm may be blocked. Here, the electronic device 100 may notify the encryption algorithm vulnerability collecting device 20 of execution of the sha-256 algorithm which is a vulnerable encryption algorithm.

FIG. 8 is a block diagram of an electronic device according to an embodiment of the disclosure.

Referring to FIG. 8, the electronic device 100 is implemented using an exclusive processor under a separate security environment in which a test is performed by hooking memory load of an application. Hereinafter, the electronic device 100 of FIG. 8 will be described by focusing on the differences from the electronic device 100 of FIG. 4.

Referring to FIG. 8, the electronic device 100 includes a processor 101 in which an executable code 134c of an application loaded from the storage 103 to the memory 102 is executed and an encryption algorithm monitoring processor 108 executing a plurality of instructions for determining whether loading of the executable code to the memory is allowed or not.

The security environment described with reference to FIG. 4 may be regarded as an implementation in the form of an additional encryption algorithm monitoring processor 108. That is, a program executed on the encryption algorithm monitoring processor 108 may be executed only inside the encryption algorithm monitoring processor 108, and is given no access to external resources such as the storage 103, the input/output interface 104, and the network interface 105. That is, the encryption algorithm monitoring processor 108 is an implementation of a sandbox environment.

The encryption algorithm monitoring processor 108 may include an internal storage (not shown). The access list 132*b*, the vulnerability list 131*b*, and the encryption code identification model 122 may be stored in the internal storage.

The electronic device 100 may control such that all executable codes are determined by the encryption algorithm monitoring processor 108 with respect to permission, and then loaded to the memory 102. FIG. 8 illustrates a situation where the executable code 134*a* of APP #1 may be executed by the processor 101 as the executable code 134*a* of APP #1 is loaded (134*b*) to and stored (134*c*) in the memory 102 according to determining, by the encryption algorithm monitoring processor 108, whether loading is allowed, but a loading attempt (135*b*) of the executable code 135*a* of APP #2 is determined as unallowable by the encryption algorithm monitoring processor 108 and thus the executable code 135*a* is not loaded to the memory 102. An operation of the monitoring instruction 133*b* is not different from that described with reference to FIG. 4.

Hereinafter, security enhancement methods according to some embodiments of the disclosure will be described with reference to FIGS. 9A, 9B, 9C, 10A, 10B, 11A, 11B, 12, and 13. The security enhancement methods may be performed using an electronic device. The electronic device may be, for example, the electronic devices 100 illustrated in FIG. 1. It is to be noted that the methods may include at least some of the operations of the electronic device described with reference to FIGS. 1, 2A, 2B, 3, 4, 5, 6, 7, and 8. Thus, the operations of the electronic device described with reference to FIGS. 1, 2A, 2B, 3, 4, 5, 6, 7, and 8 may be included in the methods above also without description of the operations in the description of the security enhancement methods provided below. In addition, in the description of the methods below, when a subject performing an operation is not described, the subject may be interpreted to be the electronic device.

Figure 9A:
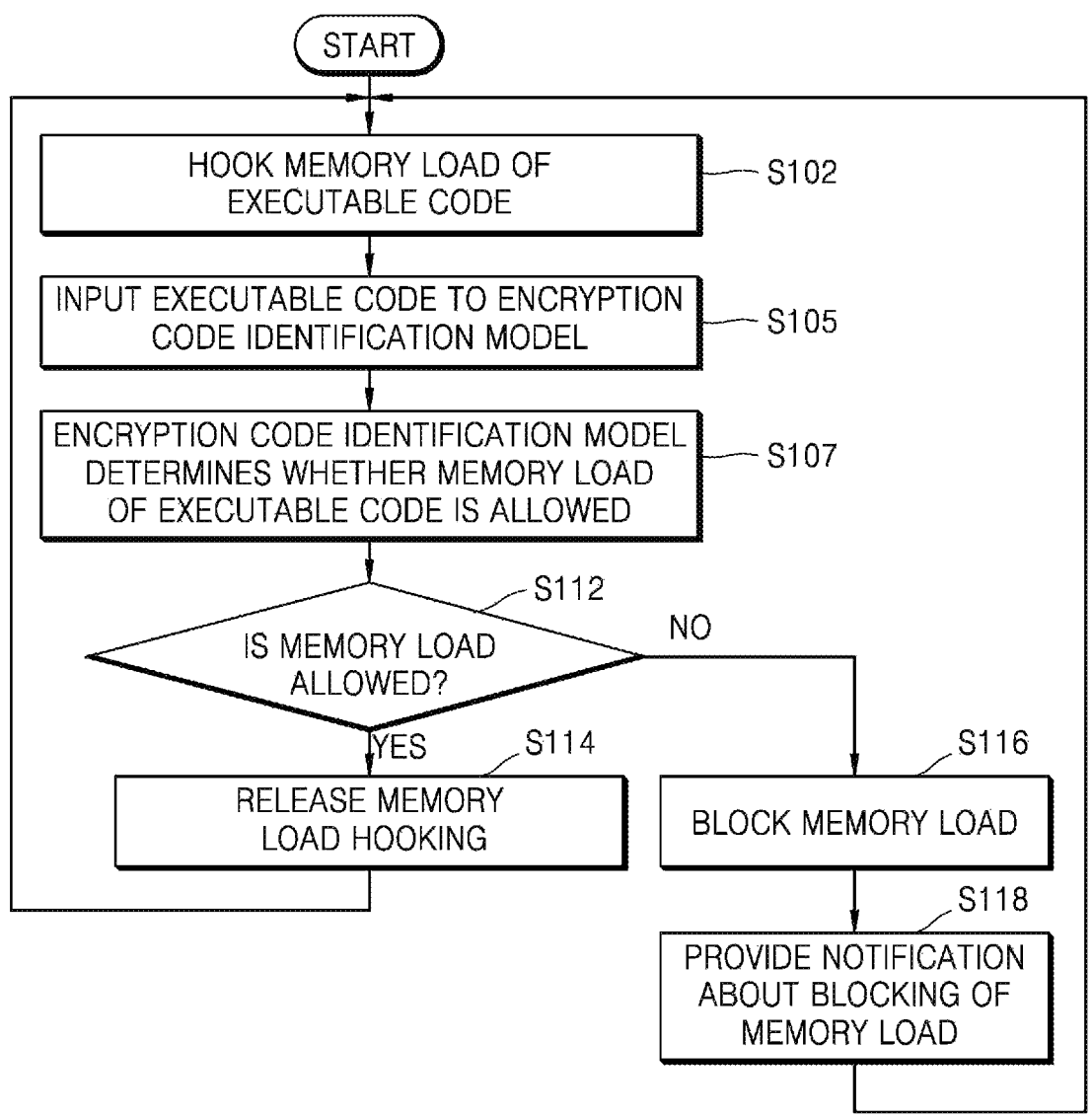
FIGS. 9A, 9B and 9C are flowcharts of a security enhancement method based on memory load hooking according to various embodiments of the disclosure.
Figure 9B:
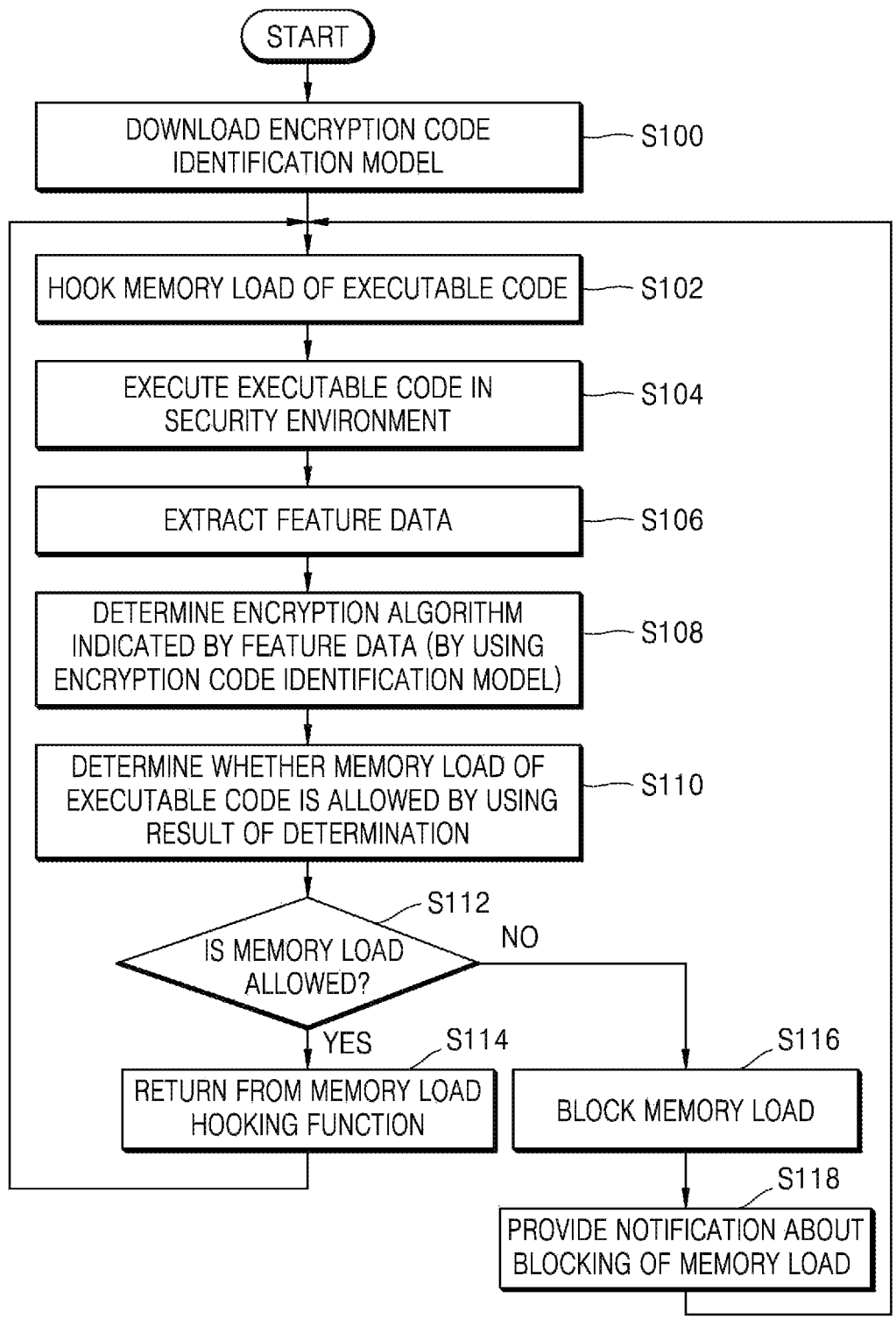
Figure 9C:
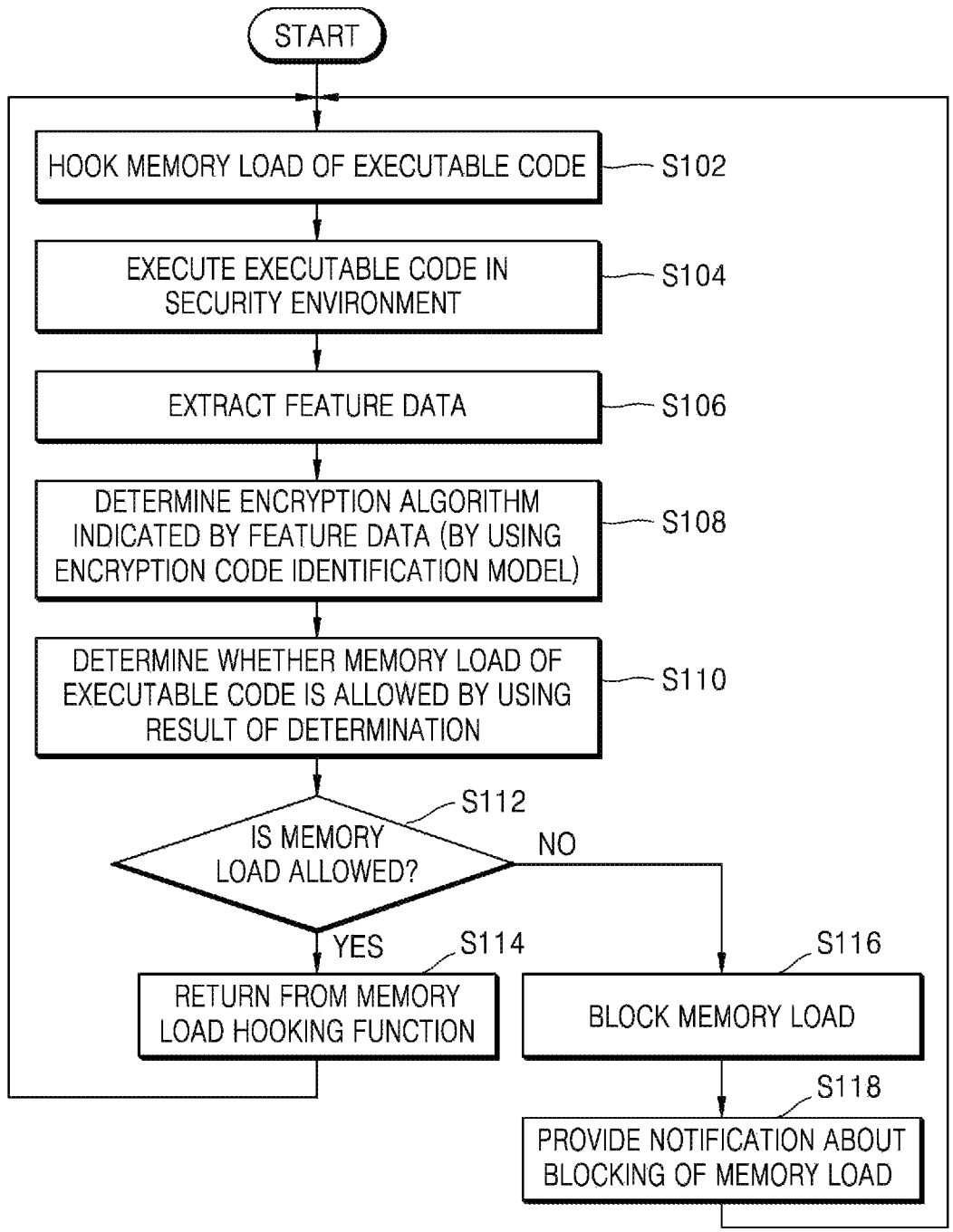

FIGS. 9A, 9B and 9C are flowcharts of a security enhancement method based on memory load hooking, according to various embodiments of the disclosure.

Referring to FIG. 9A, a method is illustrated for controlling whether to execute an application executed by the electronic device.

The memory load of an executable code of the application is hooked in operation S102. The memory load is triggered by user manipulation for executing the application, for example, selecting an icon of the application by the user of the electronic device. While the hooking temporarily holds loading of the executable code of the application to a memory, the executable code is input into an encryption code identification model in operation S105, and as a result, the encryption code identification model determines whether memory load of the executable code is allowed in operation S107.

Input of the executable code into the encryption code identification model means that the executable code is itself input into the encryption code identification model or feature data extracted from the executable code is input into the encryption code identification model. An embodiment in which feature data extracted from the executable code is input into an encryption code identification model will be described in detail below with reference to FIG. 9B or FIG. 9C.

When an encryption code identification model determines whether memory load of an executable code is allowed or not, it may mean that whether the memory load is allowed is determined by using output data of the encryption code identification model or the encryption code identification model itself determines whether the memory load is allowed.

When it is determined to allow memory load in operation S112, hooking of the memory load is released, for example, by transmitting a parameter from a hooking function to a memory load system function in operation S114. When it is determined not to allow memory load in operation S112, memory load is blocked in operation S116, and a message notifying the application is not executable due to security setting violation of the encryption algorithm included in the executable code may be displayed in operation S118.

Hereinafter, an embodiment in which feature data extracted from an executable code is input into an encryption code identification model will be described with reference to FIG. 9B.

In operation S100, data about an encryption code identification model is downloaded from an external device and stored. The external device may be the encryption code identification model training device 10 described with reference to FIG. 1. When the encryption code identification model is an artificial neural network-based model, the downloaded data may be a parameter set used to define the artificial neural network.

In the embodiment, the encryption code identification model may be embedded in an electronic device. That is, downloading of an encryption code identification model is a selective operation. In regard to this, FIG. 9C illustrates a flowchart without the operation of downloading an encryption code identification model in operation S100. When the encryption code identification model is embedded in an electronic device, the electronic device may download, from an external device, an encryption code identification model that is updated as compared with the embedded encryption code identification model. The external device may be a server for managing update of system software of the electronic device, and the server may transmit an update command for the encryption code identification model to the electronic device when the encryption code identification model is updated.

In operation S102, loading of an executable code of an application to a memory is hooked. An attempt of loading to a memory is triggered by user manipulation for executing the application such as selecting an icon of the application. While the hooking temporarily holds loading of the executable code of the application to a memory, the executable code of the application is executed in a security environment in operation S104, and feature data is extracted by reflecting a result of the execution in operation S106, and the feature data is input into the encryption code identification model to determine an encryption algorithm included in the executable code in operation S108. To prevent a decrease in an operating speed of the electronic device, in an embodiment, the executable code may be exempt from hooking by determining based on at least one of whether the executable code is included in a white list, the number of times of executing the executable code, and a period of time passed after installation or update of the application of the executable code. In addition, according to another embodiment, when there is an installation history of the application of the executable code, the hooking may be exempted.

In operation S110, whether to allow memory load with respect to the executable code of the application is determined based on a result of the determination. Hereinafter, the determining method according to some embodiments will be described.

In a first embodiment, when an executable code of an encryption algorithm is found in an executable code of an application, memory load of the executable code may be unconditionally blocked.

In a second embodiment, when output data of the encryption code identification model indicates that an encryption code is detected from the executable code, an installation record of an application of the executable code is inquired, and when no installation record of the application is found, it is determined not to allow memory load. That is, according to the embodiment, when an executable code of an encryption algorithm is found in an executable code of an application, execution of the executable code is blocked only when the application is not legitimately installed through an installer.

In a third embodiment, whether an encryption algorithm indicated by output data of an encryption code identification model is an available encryption algorithm of the application is searched from the access list described with reference to FIG. 7 or the like, and when the encryption algorithm indicated by output data of the encryption code identification model is not the available encryption algorithm of the application as a result of the search, memory load of the executable code is not allowed. That is, according to the embodiment, when an executable code of an encryption algorithm is found in an executable code of an application, execution of the executable code is blocked only when the encryption algorithm is not registered as an available algorithm in an installation package and not approved by a user.

In a fourth embodiment, the vulnerability list described with reference to FIG. 4 or the like a vulnerability of an encryption algorithm indicated by output data of an encryption code identification model is inquired from, and whether memory load of the executable code is allowed or not is determined based on the inquired information about vulnerability. That is, according to the embodiment, when an executable code of an encryption algorithm is found in an executable code of an application, execution of the executable code is blocked only when a vulnerability with respect to the encryption algorithm is reported.

In a fifth embodiment, the third embodiment and the fourth embodiment may be combined. That is, according to the embodiment, when an executable code of an encryption algorithm is found in an executable code of an application, execution of the executable code is blocked when a vulnerability is reported with respect to the encryption algorithm even when the encryption algorithm is registered as an available algorithm in an installation package and approved by a user.

In a sixth embodiment, one of the first through fifth embodiments is selected based on an environment setting value stored in an electronic device.

In a seventh embodiment, one of the first through sixth embodiments is selected based on reliability of an application. Reliability of the application may be given a higher value the higher the reliability of the manufacturer of the application, the more accurately the required permission information of the application is written, and the higher the frequency with which the application is executed.

When it is determined to allow memory load in operation S112, hooking the memory load is released, for example, by transmitting a parameter from a hooking function to a memory load system function in operation S114. When it is determined not to allow memory load in operation S112, memory load is blocked in operation S116, and a message notifying that the application is not executable due to security setting violation of the encryption algorithm may be displayed in operation S118.

Meanwhile, according to another embodiment of the disclosure, when installing an application, based on a result of detecting an executable code of an encryption algorithm included in the application, whether to normally complete the installation may be determined. The embodiment will be described with reference to FIG. 10A.

Figure 10A:
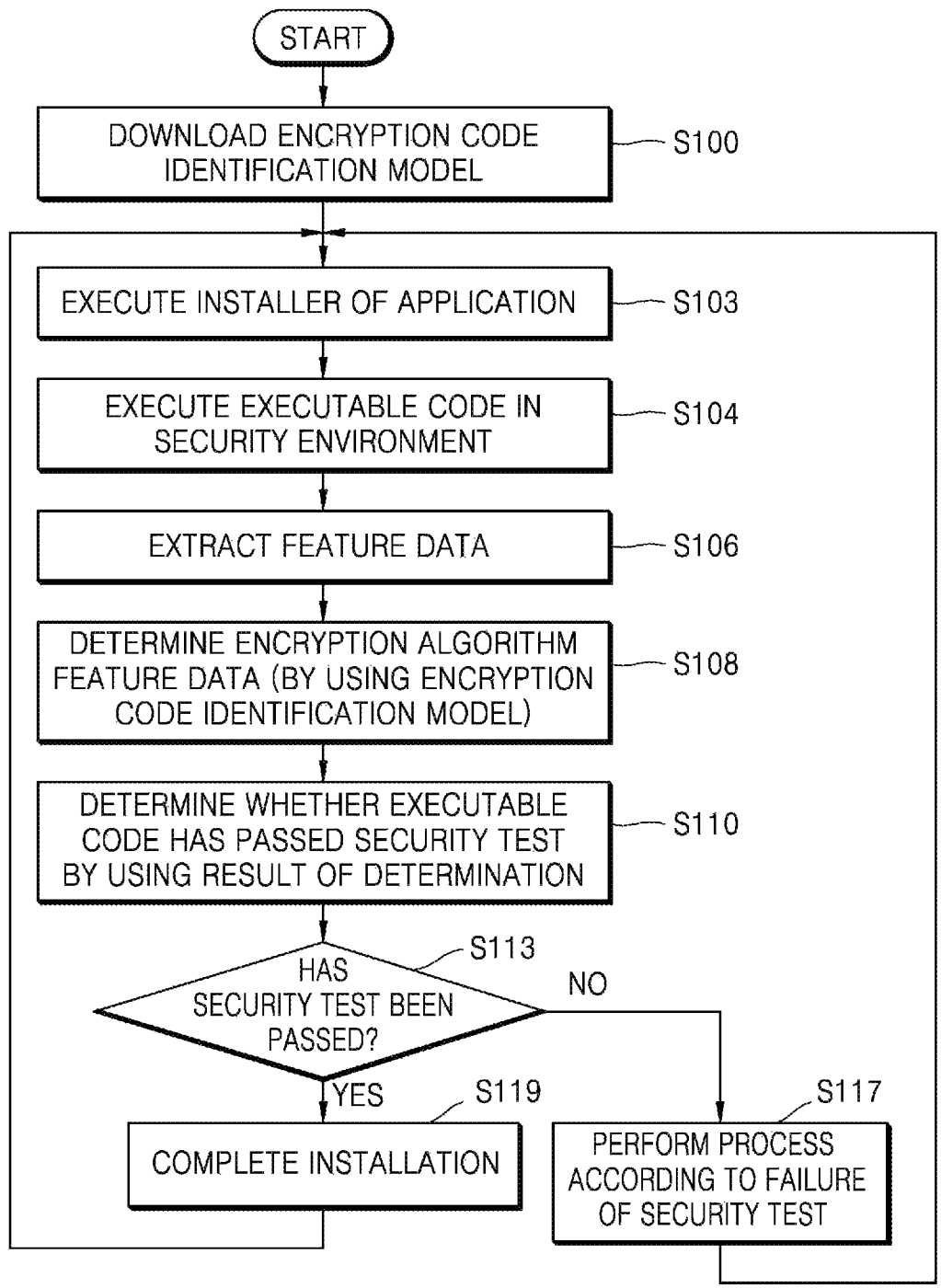
FIGS. 10A and 10B are flowcharts of a security enhancement method using an installer according to various embodiments of the disclosure.
Figure 10B:
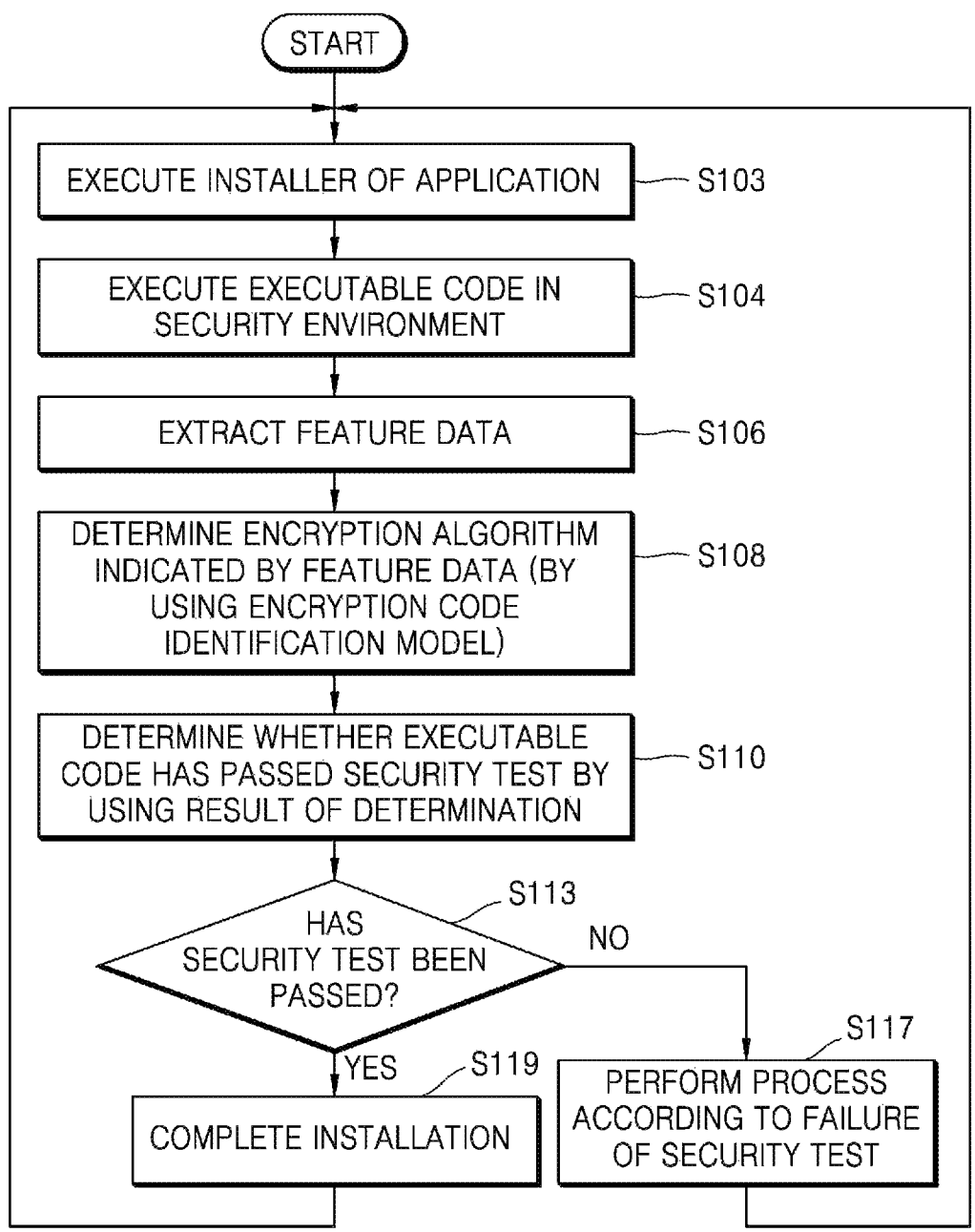

FIGS. 10A and 10B are flowcharts of a security enhancement method using an installer according to various embodiments of the disclosure.

Referring to FIG. 10A, after downloading an encryption code identification model in operation S100, an installer of an application is executed in operation S103. When an executable code of the application is configured by the installer, a security test related to an encryption algorithm regarding the executable code is immediately performed in operations S104, S106, S108, S110, and S113. Regarding the security test method, the operations described with reference to FIGS. 9A through 9C are referred. That is, to determine whether a security test is passed in operation S113, the operation related to determining whether memory load is allowed or not in operation S112 of FIGS. 9A, 9B, and 9C may be performed.

In the embodiment, the encryption code identification model may be previously stored in the electronic device. That is, downloading of an encryption code identification model is a selective operation. In regard to this, FIG. 10B illustrates a flowchart without the operation of downloading an encryption code identification model in operation S100.

As a result of determination, when it is determined that there is no problem in the executable code of the application, installation will be completed normally in operation S119. On the other hand, when an executable code of an application is determined to be problematic, a previously designated process is performed on the application in operation S117. For example, a notification message for a user may be displayed, and the application may be uninstalled again.

According to the embodiment, installation of an application that may be a problem in regard to an encryption algorithm may be completely blocked.

According to another embodiment of the disclosure, encryption function stability of an application is pre-tested based on a result of identification of an encryption algorithm included in an executable code of the application. The embodiment will be described with reference to FIGS. 11A and 11B.

Figure 11A:
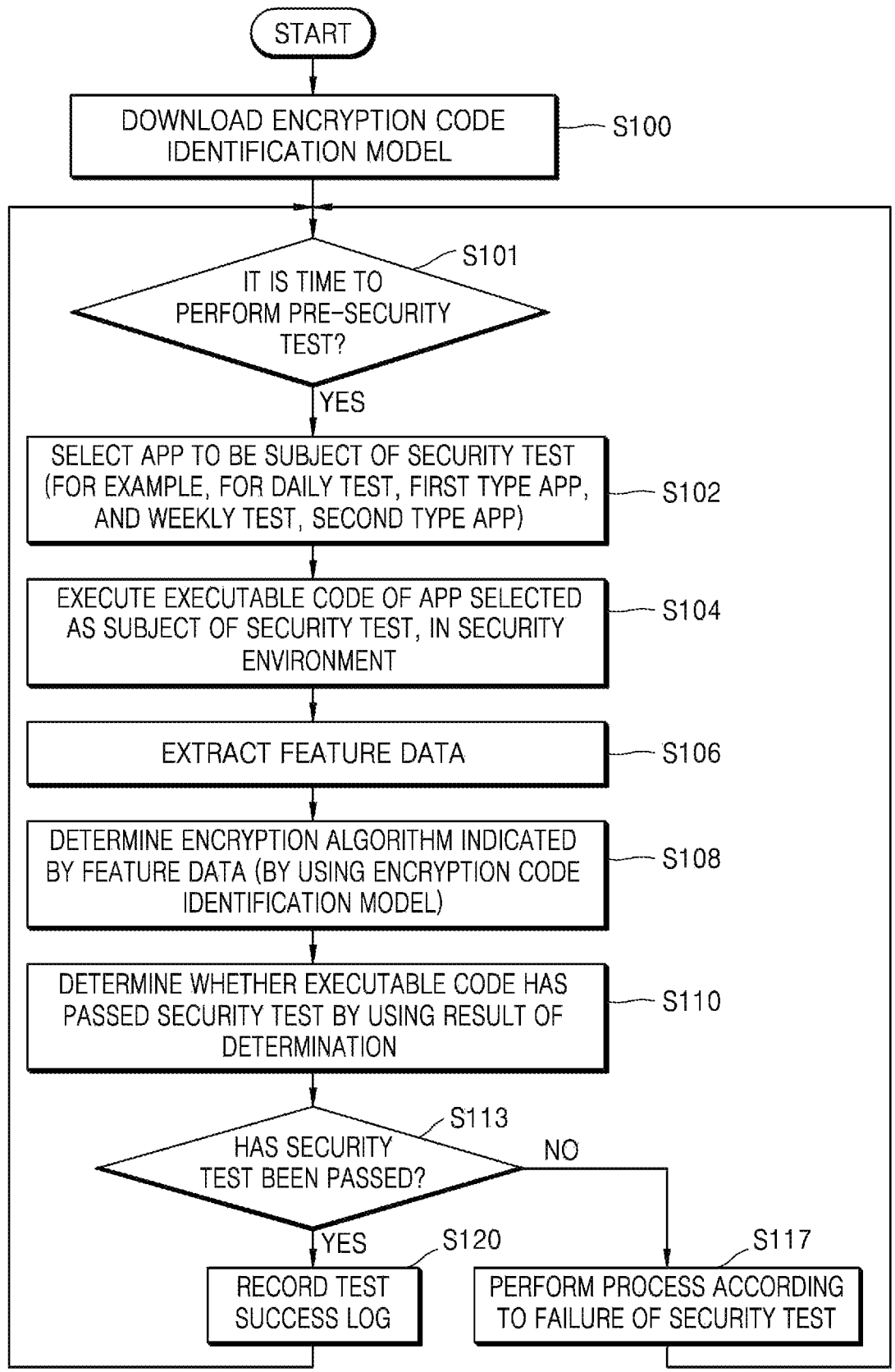
FIGS. 11A and 11B are flowcharts of another security enhancement method according to various embodiments of the disclosure.
Figure 11B:
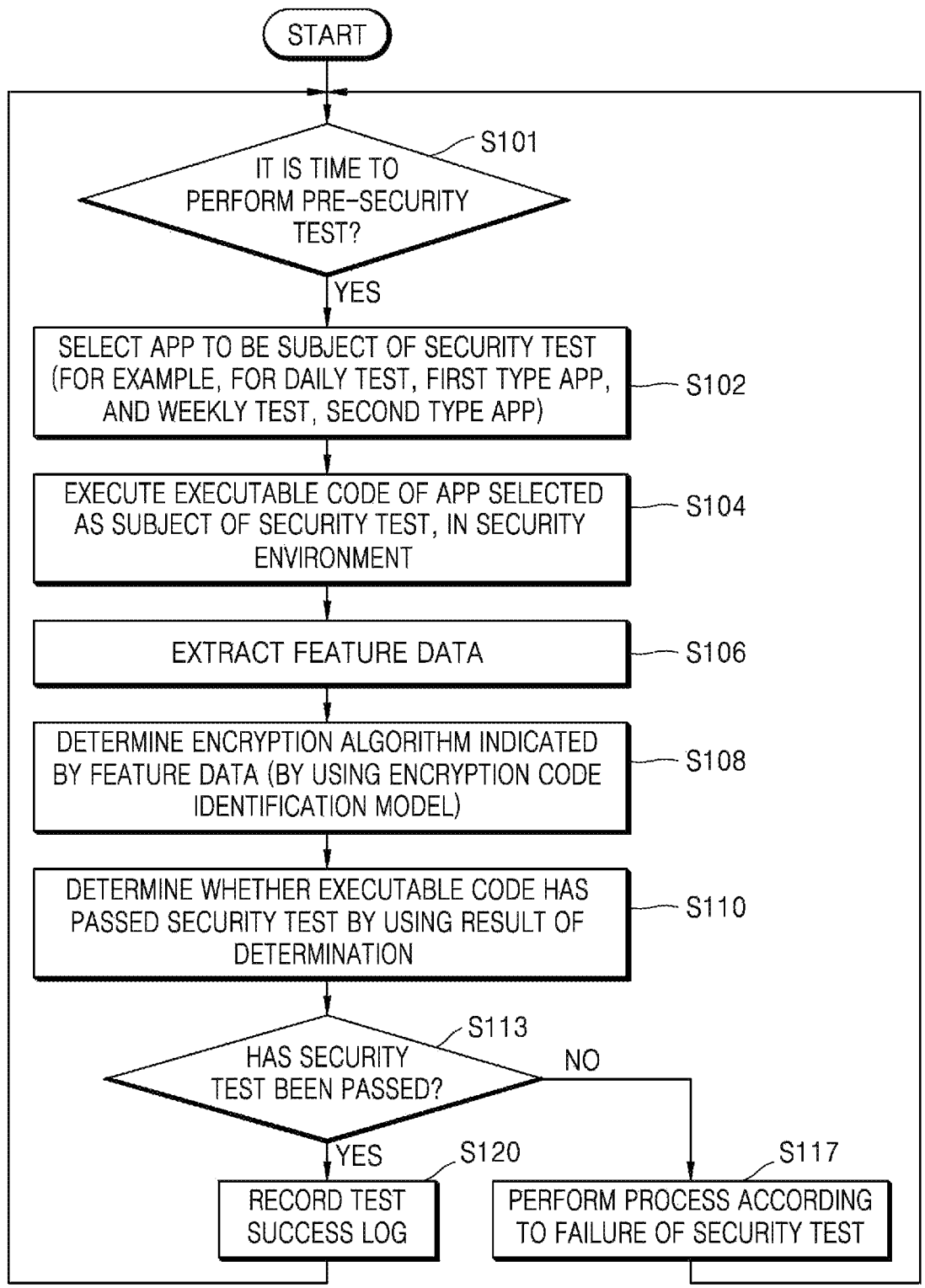

FIGS. 11A and 11B are flowcharts of another security enhancement method according to various embodiments of the disclosure.

Referring to FIG. 11A, after downloading an encryption code identification model in operation S100, in operation S101, whether it is time to perform a pre-security test is determined. The pre-security test may be repeated periodically or performed when a particular event occurs. The pre-security test may be a test of a first period or a test of a second period. For example, the test of the first period may be a daily test, and the test of the second period may be a weekly test. The particular event may be, for example, reception of a trigger message for performing a test, from an external device such as a security service server.

In the embodiment, the encryption code identification model may be previously stored in the electronic device. That is, downloading of an encryption code identification model is a selective operation. In regard to this, FIG. 11B illustrates a flowchart without the operation of downloading an encryption code identification model in operation S100.

When it is determined that it is time to perform a pre-security test in operation S101, in operation S102, an application to be a subject of a security test is selected. For example, when a pre-security test to be performed now is a daily test, an application to be subject of a daily test may be selected, and when a pre-security test to be performed now is a weekly test, an application to be a subject of a weekly test may be selected.

In an embodiment, an application of a type with a high execution frequency is more likely to be important, and thus the application may be selected as a target of a pretest with a short period, such as a daily test. According to the above, a frequency of execution of an application which is a subject of a pre-security test of a first period may be higher than that of an application which is a subject of a pre-security test of a second period which is longer than the first period.

In another embodiment, it is also likely that an application having an icon placed in a background screen of a default page is more important, and thus the application may be selected as a target of a pretest with a short period, such as a daily test.

In another embodiment, target applications of a pre-security test may be selected by reflecting a category of an application. For example, applications in categories where security is of major concern, such as "finance", "photo and video", "productivity", "social networking", "shopping" and "medicine" may be a subject of a short-period pre-security test such as a daily test.

Next, a security test related to the encryption algorithm is performed on the selected applications as a subject of the security test in operations S104, S106, S108, and S110. Regarding the security test method, the operations described with reference to FIGS. 9A, 9B, and 9C are referred. That is, to determine whether a security test is passed in operation S113, the operation related to determining whether memory load is allowed or not in operation S112 in FIGS. 9A, 9B, and 9C may be performed.

As a result of the determination, when it is determined that there is no problem in the executable code of the application, a security test result log will be recorded in the electronic device in operation S120. The security test result log includes data about a test time point and a test result of each application as a subject of the security test. As described above, an application, for which a test effective period is not expired from a point the application passed the security test, may be exempt from memory load hooking. On the other hand, when an executable code of an application which is a subject of the security test is determined to be problematic, a previously designated process is performed on the application in operation S117. For example, a notification message for a user may be displayed, and an application that has not passed a security test may be forcibly uninstalled, or the executable code of the application may be removed.

Figure 12:
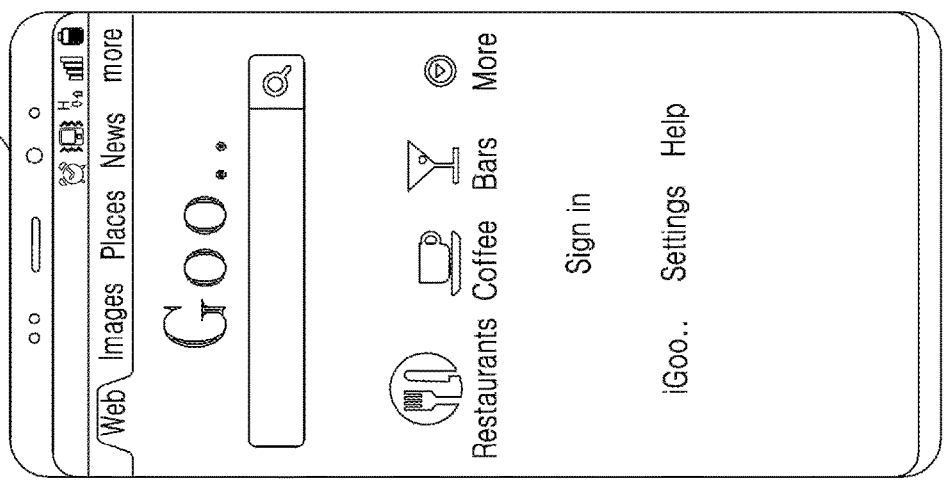
FIG. 12 illustrates views of security enhancement methods according to various embodiments of the disclosure.
Figure 12:
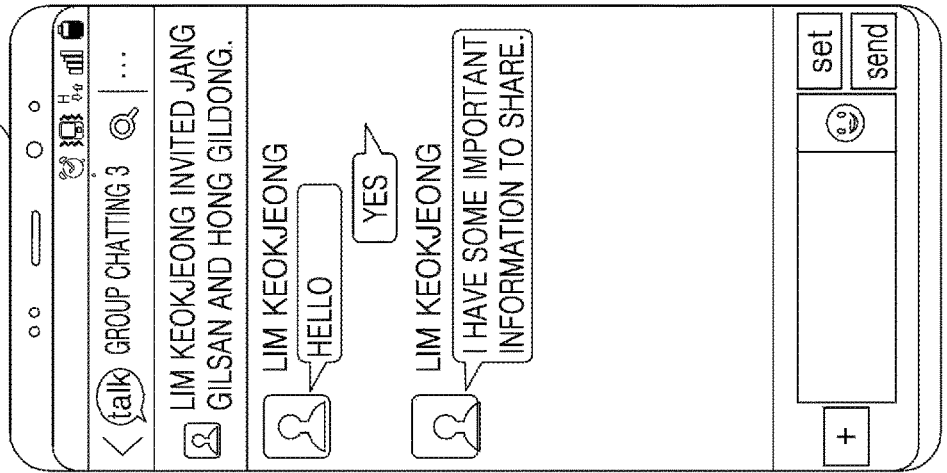
Figure 12:
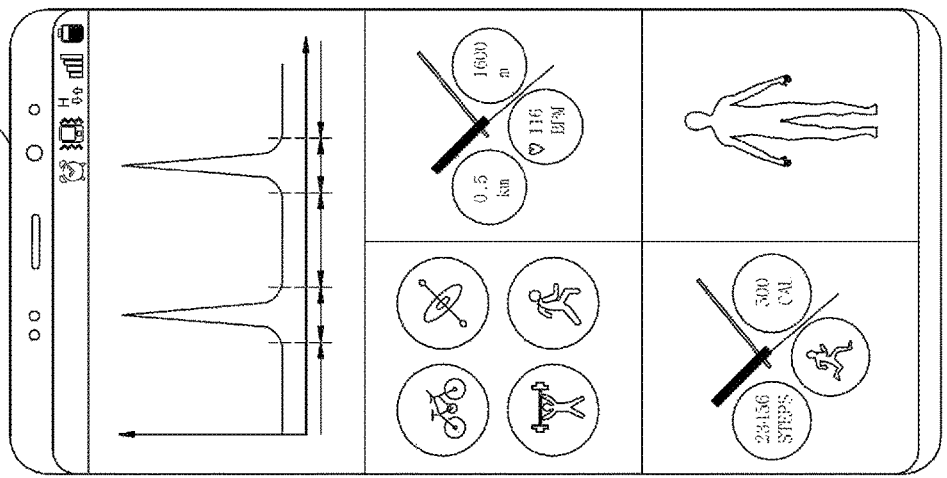

FIG. 12 illustrates views of security enhancement methods according to various embodiments of the disclosure.

Referring to FIG. 12, an application is illustrated in which the pretest described in the description of the method according to FIG. 11A or FIG. 11B is performed at a high frequency and an application on which the pretest described in the description of the method according to FIG. 11A or FIG. 11B is performed at a low frequency. A pretest may be frequently performed on an application 137 involving data of high importance; a pretest may be performed at a medium frequency on an application 138 involving data of medium importance; and a pretest may be performed at a low frequency on an application 139 involving data of low importance.

The application 137 involving data of high importance may be, for example, a healthcare application for generating and processing information related to a user's health or an application for performing financial functions such as mobile banking and stock trading.

The application 138 involving data of medium importance may be, for example, a social networking service (SNS)-related application for generating and processing information related to privacy of a user.

The application 139 involving data of low importance may be, for example, an information query application (e.g., a web browser) that accesses information open to the public.

In another embodiment, an encryption attempt beyond the access rights approved to an application is detected and the attempt is blocked. The embodiment will be described with reference to FIG. 13.

Figure 13:
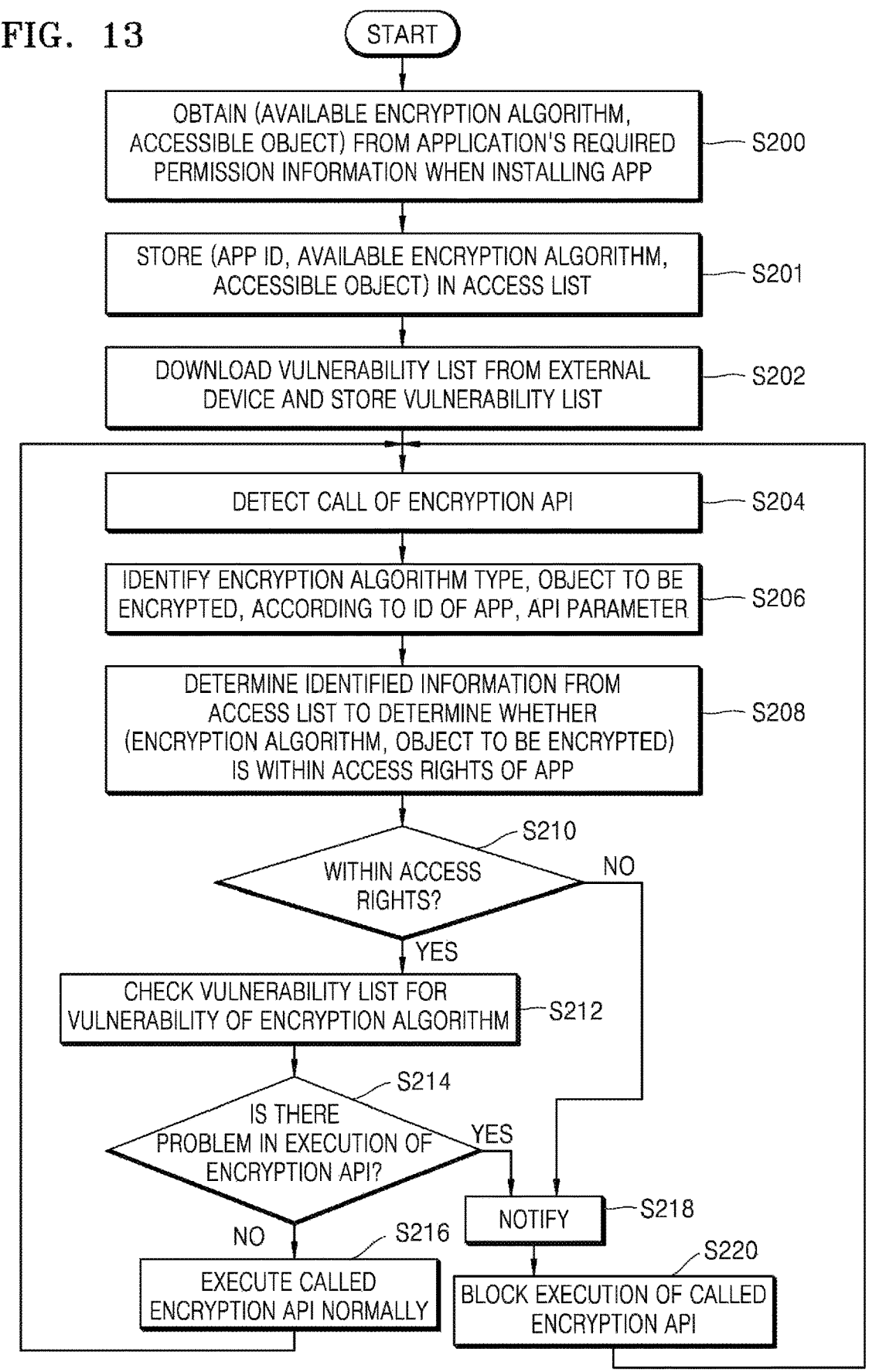
FIG. 13 is a flowchart of an access-rights-based security enhancement method according to an embodiment of the disclosure.

FIG. 13 is a flowchart of an access-rights-based security enhancement method according to an embodiment of the disclosure.

Referring to FIG. 13, in operation S200, information (e.g., an available encryption algorithm, accessible objects, etc.) is obtained from permission information of an application installation package (for example, a manifest file), and in operation S201, the obtained information is stored in an access list. Operation S200 and operation S201 may be performed at a point of installing the application. In addition, in operation S202, a vulnerability list downloaded from an external device such as the encryption algorithm vulnerability collecting device 20 of FIG. 1 is stored.

In operation S204, calling of an encryption API by an executable code of the application, the encryption API being provided by an operating system of the electronic device, is detected within a function of the encryption API. Information about a type of the encryption algorithm and data to be encrypted is introduced into a routine inside the function in the form of a parameter of the encryption API. In operation S206, the introduced information may be used to identify a type of an encryption algorithm and an object to be encrypted. In operation S206, by using identifier information of a process that has called the encryption API, an identifier of the application is also identified.

In operation S208, by checking the identified information from the access list, whether (type of the encryption algorithm, object to be encrypted) according to the call of the encryption API is within an accessible range of the application is determined. When the call of the encryption API is not within an accessible range in operation S210, a message notifying that the application attempted encryption beyond access rights is displayed in operation S218, and execution of internal logic related to encryption of the called encryption API is blocked in operation S220.

When the call of the encryption API is within an accessible range in operation S210, whether the encryption algorithm according to the call of the encryption API has a vulnerability is inquired in the vulnerability list in operation S212. When it is determined as a result of inquiry that there will be a problem in execution of the encryption API due to, for example, a vulnerability score of the called encryption algorithm exceeding a reference value in operation S214, a message notifying that execution of an encryption algorithm known to have a vulnerability in an application is attempted is displayed, and notifying an external device of the attempt of execution of the encryption algorithm is performed in operation S218, and execution of internal logic related to encryption of the called encryption API is blocked in operation S220. When it is determined as a result of the inquiry that there will be no problem in execution of the encryption API in operation S214, the called encryption API is executed normally in operation S216. Unlike FIG. 13, a procedure of determining in regard to vulnerability may not be performed, and when the call of the encryption API is within an accessible range in operation S210, the encryption API may be immediately performed in a normal manner in operation S216.

The method according to the embodiment of the disclosure described above can be performed by execution of a computer program embodied by a computer-readable code. The computer program may be transmitted from a first electronic device to a second electronic device and installed on the second electronic device via a network such as the Internet, and thus may be used in the second electronic device. The first electronic device and the second electronic device may include any of a server device, a physical server belonging to a server pool for a cloud service, and a fixed-type electronic device such as a desktop personal computer (PC).

The computer program may be stored on a non-transitory recording medium such as a digital versatile disc (DVD)-ROM, a flash memory device or the like.

It should be understood that embodiments described herein should be considered in a descriptive sense only and not for purposes of limitation. Descriptions of features or aspects within each embodiment should typically be considered as available for other similar features or aspects in other embodiments.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A security enhancement method performed using an electronic device, the security enhancement method comprising:
   obtaining available encryption algorithms from permission information included in an installation package of an application;
   matching and storing identification information of the application and the available encryption algorithms in an access list;
   holding loading of executable code of the application into a memory;
   inputting the executable code into an encryption code identification model;
   determining, by using the encryption code identification model, whether the loading of the executable code into the memory is allowed;
   when the loading of the executable code is allowed, loading the executable code into the memory; and
   when the loading of the executable code is not allowed, blocking the loading of the executable code into the memory,
   wherein the determining comprises, when first output data of the encryption code identification model identifies an encryption algorithm that is not in the access list, determining that the loading of the executable code is not allowed.

2. The security enhancement method of claim 1, further comprising:
   extracting feature data from the executable code; and
   inputting the feature data into the encryption code identification model.

3. The security enhancement method of claim 2, wherein the feature data comprises a call sequence of a mathematical function or a logical function that is repeatedly called during execution of the executable code.

4. The security enhancement method of claim 2,
   wherein the feature data comprises power consumption data related to power consumption of a central processing unit (CPU) during execution of the executable code, and
   wherein the power consumption data includes a number of CPU operation cycles when the power consumption of the CPU is equal to or greater than a threshold.

5. The security enhancement method of claim 1,
   wherein, when second output data of the encryption code identification model indicates that encryption code is detected in the executable code, the loading of the executable code is not allowed, and
   wherein, when the second output data of the encryption code identification model indicates that encryption code is not detected in the executable code, the loading of the executable code is allowed.

6. The security enhancement method of claim 1,
   wherein, when second output data of the encryption code identification model indicates that encryption code is detected in the executable code, and when an installation record of the application is not found, the loading of the executable code is not allowed.

7. The security enhancement method of claim 1, further comprising:
   receiving vulnerability information of an encryption algorithm from an external device and storing the vulnerability information in a vulnerability list,
   wherein, when second output data of the encryption code identification model identifies a vulnerability in the vulnerability list, the loading of the executable code is not allowed.

8. The security enhancement method of claim 1, further comprising determining whether to perform the holding based on at least one of whether the executable code is included in a white list, a frequency of execution of the executable code, or a period of time that has elapsed since an installation or an update of the application.

9. The security enhancement method of claim 1, further comprising determining whether to perform the holding based on whether there is an installation history of the application.

10. A security enhancement method performed using an electronic device, the security enhancement method comprising:
    when installing an application, obtaining available encryption algorithms from permission information included in an installation package of the application;

matching and storing identification information of the application and the available encryption algorithms in an access list;
inputting executable code of the application into an encryption code identification model;
determining whether the executable code passes a security test based on output data of the encryption code identification model; and
when the security test fails, performing a designated process on the application,
wherein the determining comprises, when the output data of the encryption code identification model identifies an encryption algorithm that is not in the access list, determining that the executable code fails the security test.

11. A security enhancement method performed using an electronic device, the security enhancement method comprising:
obtaining available encryption algorithms from permission information included in an installation package of an application;
matching and storing identification information of the application and the available encryption algorithms in an access list;
performing, on a first type of application, a security audit at a first frequency, without user manipulation for executing the first type of application; and
performing, on a second type of application, the security audit at a second frequency, without user manipulation for executing the second type of application,
wherein the security audit comprises:
inputting an executable code of the application to an encryption code identification model, and
determining whether the executable code has passed a security test, based on whether output data of the encryption code identification model identifies an encryption algorithm that is not in the access list.

12. A security enhancement method performed using an electronic device, the security enhancement method comprising:
obtaining available encryption algorithms and accessible objects from permission information included in an installation package of an application;
matching and storing identification information of the application, the available encryption algorithms, and the accessible objects in an access list;
detecting an instruction to encrypt an object using an encryption algorithm of an encryption application programming interface (API), the encryption API being provided by an operating system installed on the electronic device;
determining, based on the access list, whether the encryption algorithm and the object can access the encryption API based on access rights of an application; and
when the encryption algorithm or the object cannot access the encryption API, blocking the instruction.

13. The security enhancement method of claim 12, further comprising:
receiving vulnerability information of an encryption algorithm from an external device;
updating a vulnerability list based on the vulnerability information; and
determining whether to perform the instruction based on whether the vulnerability list includes a vulnerability to be performed by the instruction.

14. The security enhancement method of claim 12, further comprising:

receiving vulnerability information of an encryption algorithm from an external device;
updating a vulnerability list based on the vulnerability information; and
when the vulnerability information includes a vulnerability to be performed by the instruction, notifying the external device of execution of the vulnerability of the encryption algorithm.

15. An electronic device comprising:
a processor;
a storage configured to store an application and an access list including available encryption algorithms obtained from permission information included in an installation package of the application; and
a memory storing a plurality of instructions executable by the processor,
wherein the plurality of instructions comprise:
an instruction to hold loading of executable code of the application into the memory;
an instruction to input the executable code into an encryption code identification model;
an instruction to determine whether the loading of the executable code is allowed based on the encryption code identification model;
an instruction to, when the loading of the executable code is allowed, load the executable code into the memory; and
an instruction to, when the loading of the executable code is not allowed, block the loading of the executable code into the memory, and
wherein the instruction to determine comprises, when first output data of the encryption code identification model identifies an encryption algorithm that is not in the access list, an instruction to determine that the loading of the executable code is not allowed.

16. The electronic device of claim 15,
wherein the plurality of instructions further comprise:
an instruction to execute the executable code in a security environment, and
an instruction to input a value into the encryption code identification model based on a result of the execution of the executable code,
wherein the security environment is a sandbox environment, and the result of execution of the executable code does not affect system resources outside of the sandbox environment.

17. The electronic device of claim 15, further comprising:
a network interface configured to receive a vulnerability list including information about a vulnerability of an encryption algorithm that is received from an external device via the network interface,
wherein the plurality of instructions further comprise an instruction to determine whether second output data of the encryption code identification model identifies a vulnerability in the vulnerability list.

18. The electronic device of claim 15,
wherein the plurality of instructions further comprise an installation function, and
wherein the installation function comprises:
an instruction to execute the executable code of in a security environment,
an instruction to extract feature data of the executable code based on a result of the execution,
an instruction to input the feature data into the encryption code identification model, an instruction to determine whether the executable code has passed a security test based on second output data of the encryption code identification model, and an instruction to uninstall the application when the security test is not passed.

19. The electronic device of claim 18, wherein the installation function further comprises:

an instruction to count a number of operation cycles of the processor during the execution the executable code, an instruction to determine a power consumption of the processor during the execution the executable code, and an instruction to input the number of operation cycles and the power consumption into the encryption code identification model.

20. The electronic device of claim 15, wherein the plurality of instructions further comprise a function to perform a security audit on the application without user input, wherein the function to perform the security audit comprises:

an instruction to input the executable code into the encryption code identification model and determine whether the executable code has passed a security test based on second output data of the encryption code identification model, an instruction to perform a predefined process when the security test is not passed, and an instruction to record a security pass in a log of the application when the security test is passed, and wherein the plurality of instructions further comprise an instruction to determine whether to perform the instruction to hold the loading of the executable code based on whether there is the security test passed within a time period.

* * * * *